(12) United States Patent
Patera et al.

(10) Patent No.: US 7,787,754 B2
(45) Date of Patent: Aug. 31, 2010

(54) CONTINUOUS EXTENSION OF DISCRETE TRANSFORM FOR DATA PROCESSING

(75) Inventors: Jiri Patera, Montréal (CA); Armen Atoyan, Montréal (CA)

(73) Assignee: Université de Montréal, Montréal, Quebec ( * ) Notice: Subject to any disclaimer, the term of this patent is extended or adjusted under 35 U.S.C. 154(b) by 1213 days.

(21) Appl. No.: 11/293,165

(22) Filed: Dec. 5, 2005

(65) Prior Publication Data

US 2006/0262994 A1 Nov. 23, 2006

Related U.S. Application Data

(63) Continuation-in-part of application No. 11/130,419, filed on May 17, 2005, now abandoned.

(51) Int. Cl.
*H04N 7/00* (2006.01)
*H04N 7/26* (2006.01)

(52) U.S. Cl. .................................. 386/108; 386/111

(58) Field of Classification Search ............... 386/1, 386/46, 95, 108, 109, 111–112; 382/232, 382/241, 248, 275, 277
See application file for complete search history.

(56) References Cited

FOREIGN PATENT DOCUMENTS

WO 03017676 2/2003

OTHER PUBLICATIONS

A. Atoyan, J. Patera, "Properties of Continuous Fourier Extension of the Discrete Cosine Transform and its Multidimensional Generalization", Journal of Mathematical Physics, vol. 45 (2004), pp. 2468-2491.

Armen M. Atoyan, Jiri Patera, "Continuous Extension of the Discrete Cosine Transform, and Its Applications to Data Processing", Centre de Recherche Mathématiques, vol. 39 (2004), pp. 1-15.

A. Atoyan, J. Patera, "Application of Continuous Extension of DCT to Flir Images", CRM, Univesité de Montréal, Canada.

J. Patera, A. Zaratsyan, "Discrete and Continuous Cosine Transform Generalized to Lie Groups $SU(2) \times SU(2)$ and $O(5)$", Journal of Mathematical Physics, vol. 46 (2005), 053514.

J. Patera, A. Zaratsyan, "Discrete and Continuous Cosine Transform Generalized to Lie Groups $SU(3)$ and $G(2)$", Journal of Mathematical Physics, vol. 46 (2005), 223506.

Markus Püschel, Martin Rötteler, "The Discrete Triangle Transform", Dept. of Electrical and Computer Engineering Carnegie Mellon University, Pittsburgh, U.S.A., Dept. of Combinatorics and Optimization University of Waterloo, Waterloo, Canada (2004-2005).

A. Atoyan, J. Patera, V. Sahakian, A. Akhperjanian, "Fourier Transform Method for Imaging Atmospheric Cherenkov Telescopes", Astroparticles Physics, vol. 23 (2005), pp. 79-95.

A. Akhperjanian, A. Atoyan, J. Patera, V. Sahakian, "Application of Multi-Dimensional Discrete Transforms on Lie Groups for Image Processing", Yervan Physics Institute, Armenia, CRM, Université de Montréal, Canada.

Andrew B. Watson, "Image Compression using the Discrete Cosine Transform", Mathematical Journal, vol. 4(I), 1994, pp. 81-88.

*Primary Examiner*—Thai Tran
*Assistant Examiner*—Nigar Chowdhury
(74) *Attorney, Agent, or Firm*—Bereskin & Parr LLP

(57) ABSTRACT

A method of interpolating images using continuous extension functions of inverse discrete transforms is described.

4 Claims, 28 Drawing Sheets

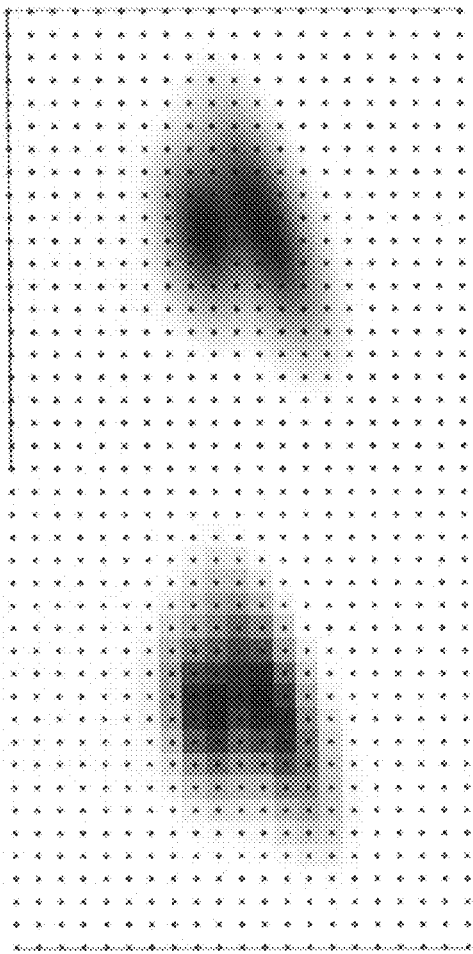
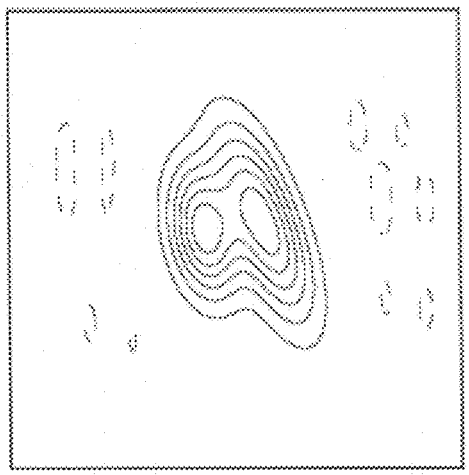
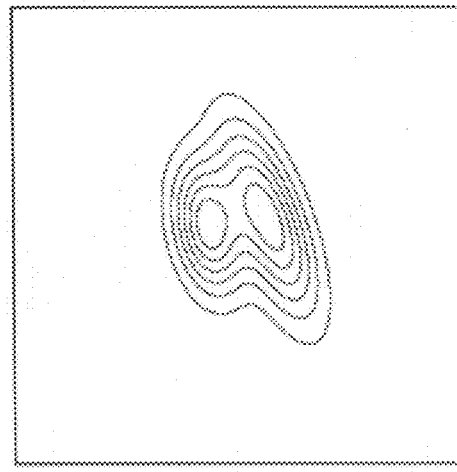
Fig.3A  Fig.3B  Fig.3C  Fig.3D

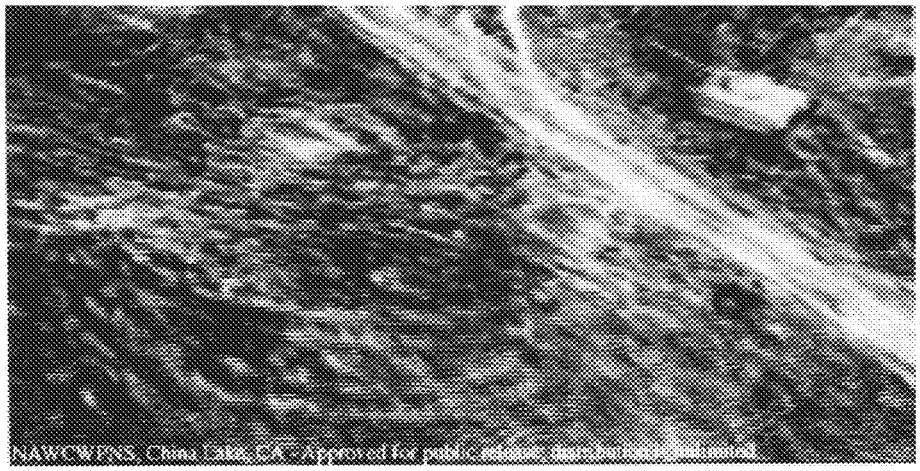
Fig.7A
Fig.7B
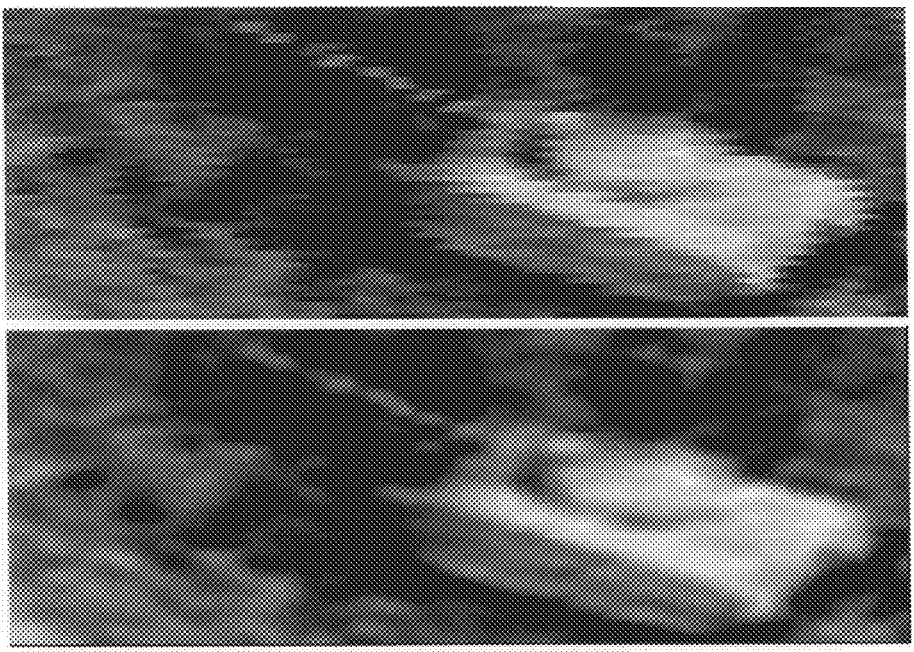
Fig.7C

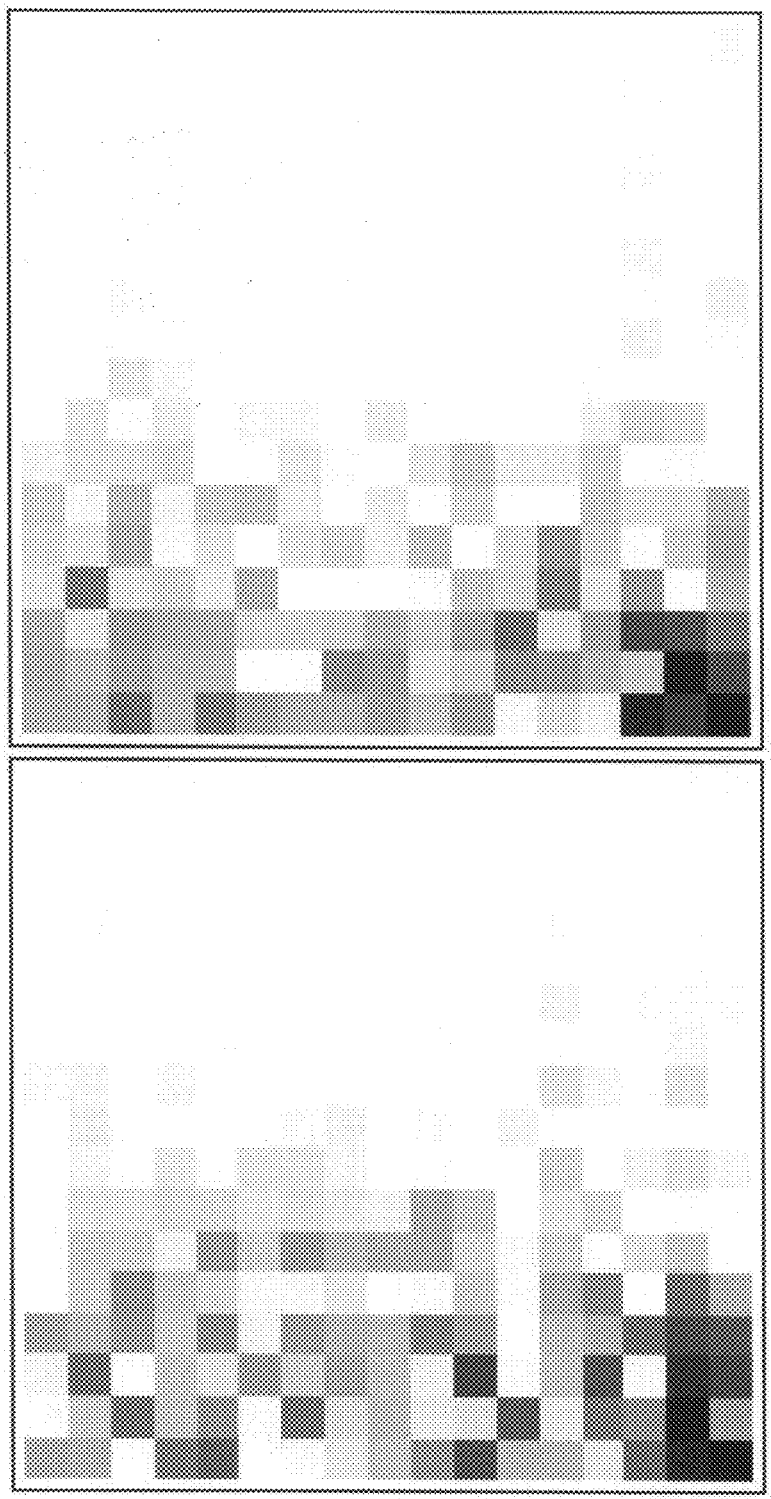

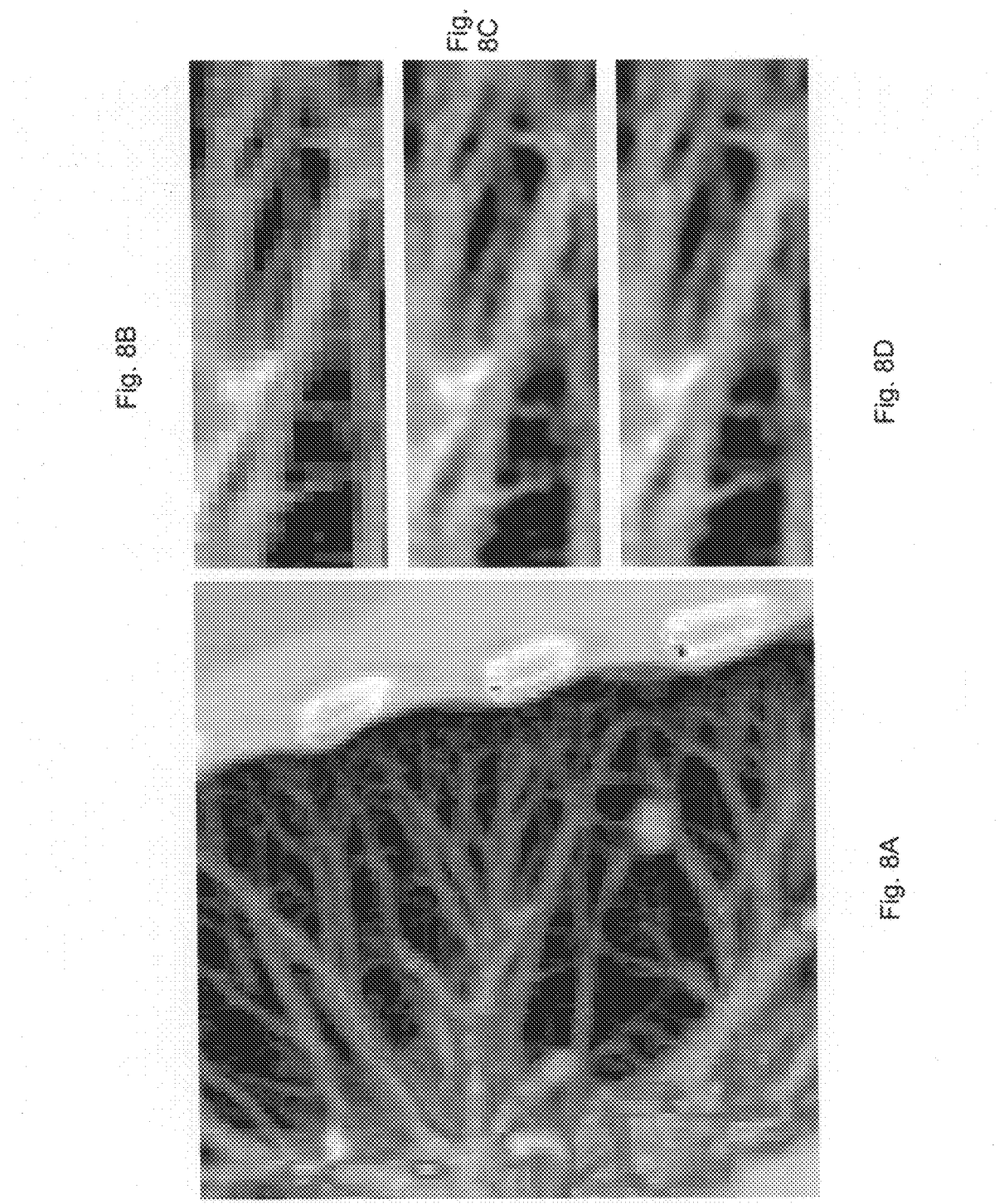

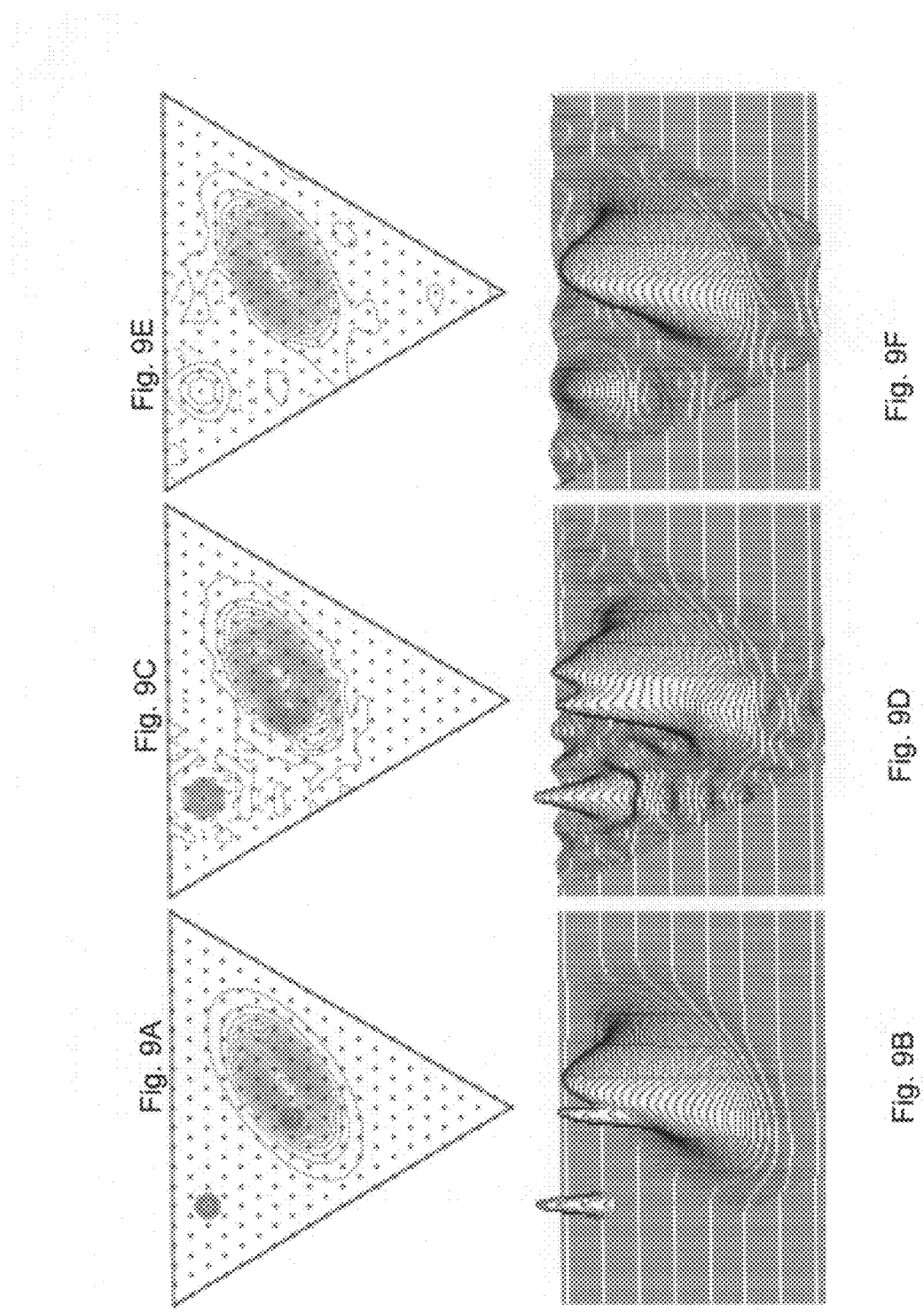

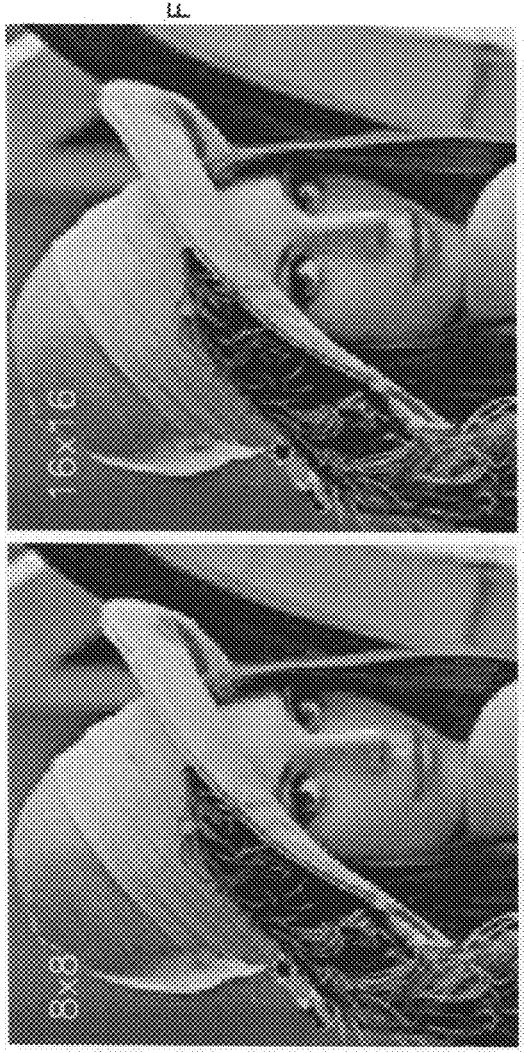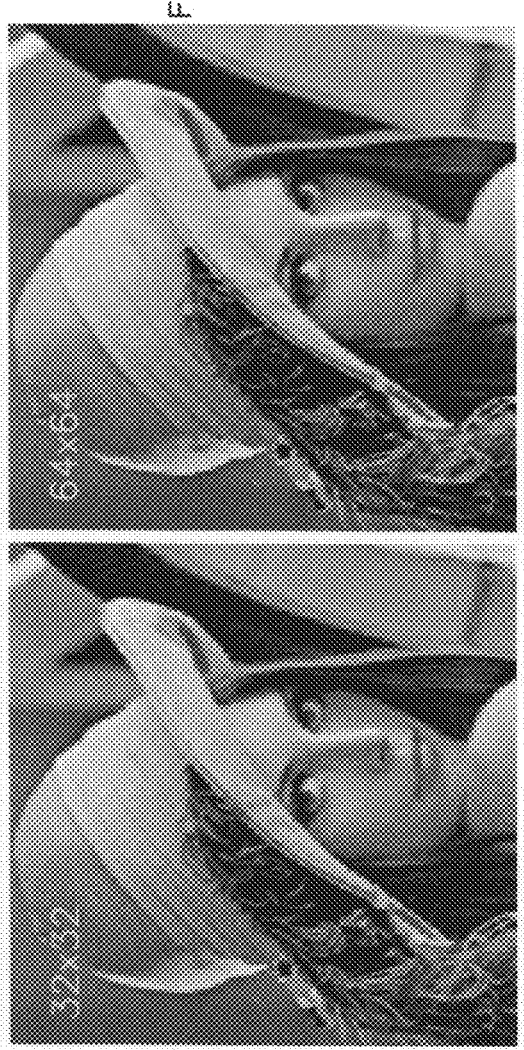
Fig. 14A  Fig. 14B  Fig. 14C  Fig. 14D

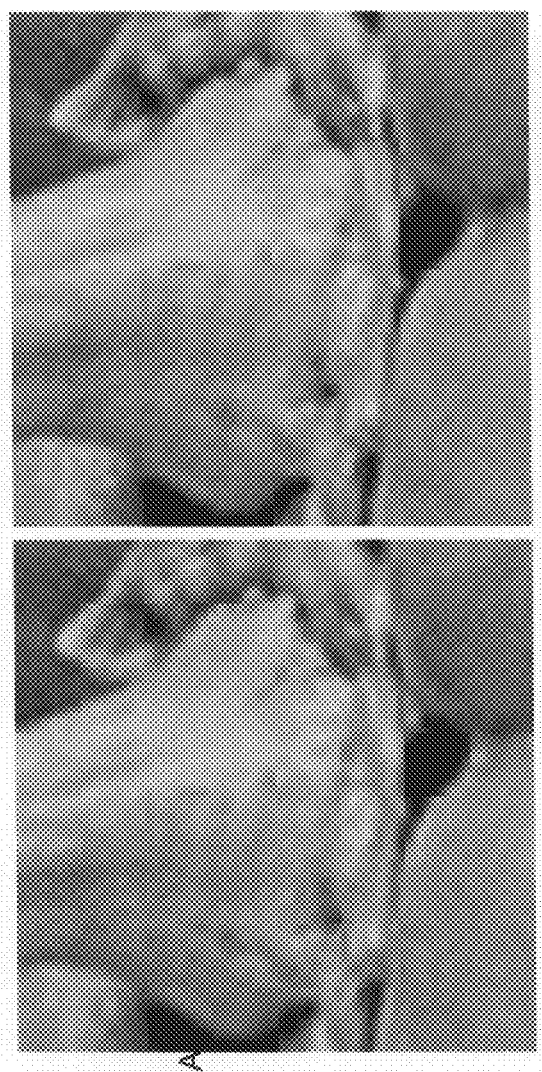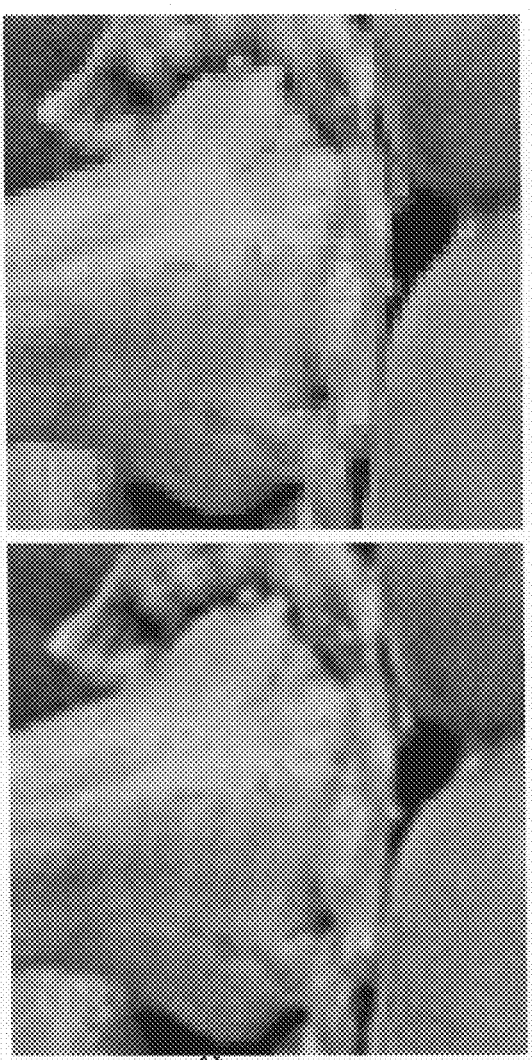

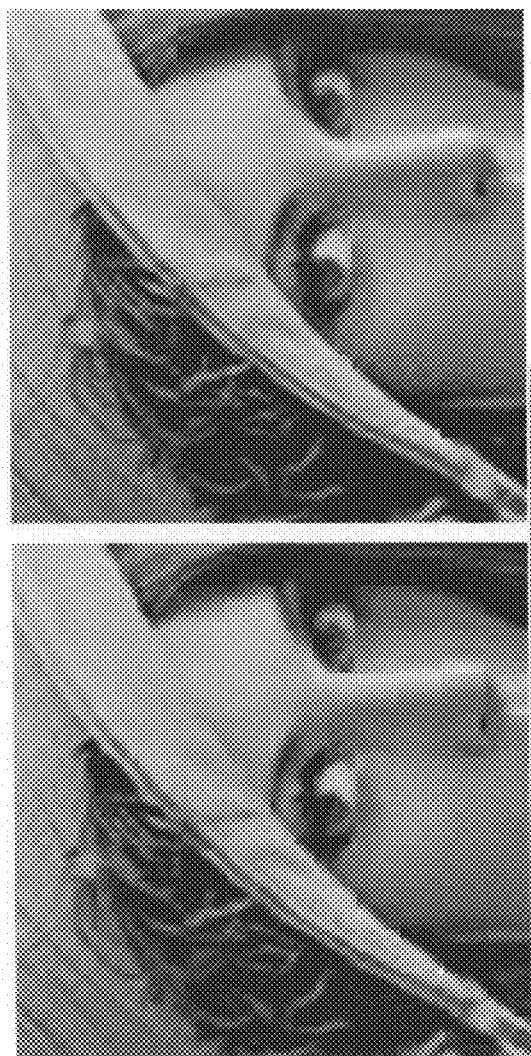
Fig. 21A
Fig. 21B
Fig. 21C

CONTINUOUS EXTENSION OF DISCRETE TRANSFORM FOR DATA PROCESSING

This application is a continuation-in-part of U.S. patent application Ser. No. 11/130,419, filed May 17, 2005, now pending having paid the basic fee.

FIELD OF THE INVENTION

The present invention relates to the field of data processing involving data interpolation, data compression and/or denoising, and more particularly related to image interpolation, compression and/or denoising in one, two, three or higher dimensions.

BACKGROUND OF THE INVENTION

Interpolation of discrete multi-dimensional data, such as an image defined on rectangular 2-dimensional grids, is needed in many practical applications. For example, we may need to zoom in on a region of interest, as for surveillance, to rotate an image, or transform data from polar to Cartesian coordinates, as required for Computed tomography imaging. When images are processed to change spatial resolution or positions of the pixels, interpolation is done by choosing a known algorithm that fits best the particular purpose. The compromise is to be reached between speed and quality of interpolation. The fastest, but worst in quality, is interpolation for the new pixel the value from the nearest neighbor. The best for quality, but worst for speed, are bicubic and higher-order polynomial interpolation algorithms involving few nearest 'rings' of pixels from the source image surrounding each pixel in the processed image. Notice that all these algorithms change the frequency content, and thus the initial information, of the original image.

The current standard image compression techniques, like JPEG, involve a step of dividing an image spatially into blocks, and calculating coefficients of the discrete transform (which is the discrete cosine transform, or DCT, in case of JPEG) for the pixel values of each block. These coefficients, if uncompressed, can be used to determine the exact pixel values of each block without loss of data by using the inverse discrete transform. While lossless coding of the transform coefficients can result in some reduction in data bit size, for the most part, the data compression takes place by reducing the information representing the transform coefficients. This compression is done in a way that has a reduced impact on the image appearance. For example, coefficients related to frequencies of lesser importance, which typically correspond to higher frequencies, can be eliminated or represented with lower precision. This step is called quantization of the coefficient data.

SUMMARY OF THE INVENTION

In the present specification, "image dataset" is intended to mean a data set $\{f_k|k=1, 2, \ldots, K\}$, else also referred to as a "discrete function", of real, or generally complex, valued numbers that could be perceived as resulting from sampling of a continuous function $f(z)$ of n-dimensional (abbreviated as "n-D") continuous variable $z \in R^n$ on a discrete grid $F(N)$ of points $\{z_k|k=1, 2, \ldots, K\}$ in n-dimensional real Euclidian space $R^n$, that is $f_k=f(z_k)$. This grid $F(N)$, where $N$ is an integer number (generally n-dimensional) that defines the density of grid points, should represent a subset of a lattice (in its mathematical definition) of a given symmetry, such as rectangular, triangular, hexagonal, etc. Each case of an n-dimensional lattice corresponds to lattice of fundamental weights, or weight lattice, of one semisimple compact Lie group of rank n, say group G. The said grid should be embedded, or should be possible to be redefined as embedded, in the fundamental region F of the group G. Semisimple compact Lie groups and attributes are well known and fully classified in mathematics. For additional information see Refs. [1-5].

Time could be a possible dimension. A 2-D (abbreviated for "2-dimensional") video sequence may thus be seen as a 3-D image dataset. A sequence of 3-D computed tomography images of a beating heart could be seen as 4-D image dataset.

In this specification, "orbit function" is intended to mean a trigonometric polynomial function defined as $$\Phi_p(z) = \sum_{\mu \in W(p)} e^{2\pi i (\mu|z)}, z \in R^n, \qquad (1)$$

where $(\mu|z)$ is scalar product, $\mu$ is a vector in n-dimensional frequency (or wave-number) space. $W(p)$ is a finite set of elements produced by a finite symmetry group $W$ from an element p, and thus represents the W-orbit of the element p from the weight lattice P of the group G.

In this specification, "discrete orbit function transform", also abbreviated DOFT, is intended to mean any transform, consisting of forward and inverse transform pair, of an image dataset into n-D frequency space by means of expansion into discrete trigonometric series $$f(z_k) = \sum_{p_j \in S(N)} A_{p_j} \Phi_{p_j}(z_k), k = 1, \ldots, K, \qquad (2)$$

the basis of which transform is composed of orbit functions defined by Equation (1), or of any linear combinations of such orbit functions, evaluated at the grid points $\{z_k\}$. In Equation (2), $S(N) \subset P$ corresponds to the set of n-dimensional frequency vectors $\{p_j|j=1, \ldots, K\}$ defining the basis functions of the transform, and N is the same number that defines the density of points in the grid $F(N)$.

In this specification, "forward discrete transform" is intended to mean solving expansion series (2) for the transform coefficients $A_{p_j}$, while "inverse discrete transform" is intended to mean the expansion of the image dataset at the grid points $\{z_k\}$ in the form of series (2).

In this specification, "continuous extension" (abbreviated CE) of a discrete transform is intended to mean a continuous function $g(z)$ which results from the inverse discrete transform when the discrete variable $z_k$ is substituted by the continuous variable $z \in R^n$. In case of discrete orbit function transform, the continuous extension of the inverse DOFT defined by Equation (2) results in $$g(z) = \sum_{p_j \in S(N)} A_{p_j} \Phi_{p_j}(z), \qquad (3)$$

where the coefficients $A_{p_j}$ are calculated from the forward discrete transform.

In this specification, "continuous extension" of DOFT of a real valued image dataset is intended to mean a real part of the continuous function $g(z)$ defined by Equation (3).

In this specification, "continuous extension" of DOFT, abbreviated here CEDOFT, is intended to mean a continuous trigonometric polynomial function composed of orbit functions, as in Equation (3), where the coefficients $A_{p_j}$ found from the forward discrete transform have then been subject to further processing and modifications, such as performing renormalization, multiplication, subtraction, decorrelation, etc. A CEDOFT can also be a continuous function produced as continuous extension of a discrete transform, the basis functions of which could be brought to orbit functions in the form of Equation (1) by a linear transformation of the argument z, i.e. by substituting $\Phi_p(z) \rightarrow \Phi_p(az+\nabla)$ in Equation (3). This can be perceived as a shift and/or rescaling of the grid F(N) in the image space.

In this specification, the term "different spatial resolution" is intended to mean, in the context of processing an input image dataset, to obtain an output image dataset defined on a set of points $\{z_k\}'$ different from the initial set $\{z_k\}'$ at least in one point, such as a different grid point spatial density (e.g. a zoom); and a different orientation (e.g. an image rotation). Such processing uses at least some interpolation of points.

In this specification, the term "non-rectangular grid" is intended to mean a grid that is a subset of a weight lattice of a Lie group having a non-rectangular fundamental region. Examples of non-rectangular grids in the case of 2D images are those originating from cameras having a honeycomb arrangement of pixels, and the quincunx arrangement of green pixels in a conventional Bayer CCD image.

In this specification, "compression factor" is intended to mean the ratio of the total number of the coefficients $\{A_{p_j}\}$ of the forward DOFT of a given image dataset to the number of these coefficients that are used in the CEDOFT to construct the compressed image.

In this specification, "block size of L" where L is a numerical value is intended to mean a block size of L in each dimension within the image dataset, namely $L=(L_1, \ldots, L_n)$. It will be apparent from the context that in some cases blocks need not be square, cubic, etc., but may be rectangular or of different shape in accordance with the lattice or grid.

In this specification, "noticeable block artifacts" is intended to mean block artifacts that an average human viewer will perceive when looking at the image as a whole. In a 16×16 block size used in JPEG2000 compression, the noticeable block artifacts that appear in the image resemble lines at the boundaries of the blocks in a square lattice. Noticeable block artifacts are not considered to be reduced by the increase in spacing between block boundary lines such that there are fewer lines within the whole image, but rather, the appearance of each line within the whole image is considered. Some images will be more susceptible to noticeable block artifacts than others at a same compression factor. When there are no noticeable block artifacts, these lines do not interfere with the appreciation of the image as a whole by the average human viewer.

It is an object of the present invention to provide a method of processing a source image that uses the continuous extension of a discrete orbit function transform to provide an image dataset having a spatial resolution different from the source image.

According to the invention, there is provided a method of processing an image dataset, the method comprising defining at least one block of the image dataset, calculating forward discrete orbit function transform (DOFT) coefficients representing the blocks, determining at least one continuous extension of discrete orbit function transform (CEDOFT) representing the blocks using the DOFT coefficients, defining a different spatial resolution, and calculating a processed image dataset using the CEDOFT and the different spatial resolution.

In some embodiments, the image dataset comprises a non-rectangular grid, and in the case that the different spatial resolution comprises a rectangular grid, the method provides image format conversion.

In the case of 2D images, the DOFT is a discrete cosine transform (DCT), for example DCT-1 or DCT-2.

In the case of image compression, the method further comprises quantizing the transform coefficients to provide compression, and the steps of defining a different spatial resolution and calculating a processed image dataset are performed as part of decompression of the image dataset. The compressed image data may desirably be stored in a first location, and the defining a different spatial resolution may comprise repeatedly specifying at least one of a desired zoom and rotation value, the processed image dataset being stored in at least one second location. This allows the compressed image dataset to be viewed according to different zoom and/or rotation parameters.

In the case of a color CCD, the method further comprises acquiring the image dataset using a CCD having a color filter array pattern of pixels, and the calculating the DOFT coefficients is done separately for each one of the colors of the CCD using the pixels for each the color to obtain DOFT coefficients for each of the colors, and the different spatial resolution is the same for each of the colors, such that the processing performs conversion from the color filter array to a color image dataset.

In the case of a color CCD whose image is to be compressed, the method further comprises quantizing the transform coefficients to provide compression, wherein the steps of defining a different spatial resolution and calculating a processed image dataset are performed as part of decompression of the image dataset.

The invention also provides a method of compressing and decompressing an image dataset, in which an image dataset to be compressed is provided, and a compression factor is defined, wherein the image dataset when compressed and decompressed using a discrete cosine transform, and block size of 16 results in noticeable block artifacts. The method comprises selecting a suitably larger block size than 16, and compressing the image dataset using the suitably larger block size and the defined compression factor to obtain a compressed image dataset. The compressed image dataset is then decompressed to obtain a decompressed image dataset having no noticeable block artifacts. Preferably, the suitably larger block size is a value of $2^n$, namely 32, 64, 128, etc., although other values are possible. While this aspect of the invention can be performed without using continuous extensions (i.e. using discrete functions only), it will be appreciated that when pixel interpolation is desired, continuous extension functions in accordance with other aspects of the present invention may be used.

BRIEF DESCRIPTION OF THE DRAWINGS

The present invention will be better understood by way of the following detailed description of specific embodiments with reference to the appended drawings, in which:

FIG. 2c shows the derivative df/dt, plotted by heavy solid line, of the same analytic function f(t) as shown in FIG. 2a, the dashed line is the derivative of the CEDCT, the thin solid line is the derivative of the CE of "real DFT", and the 3-dot—dashed line is the derivative of the Shannon interpolation function. The chosen grid resolution corresponds to N=8 intervals, as in FIG. 2a.

FIG. 3a is an image formed on the rectangular grid by sampling an analytic function composed of the sum of two 2-D Gaussian distribution functions. FIG. 3b shows the contour plot of that function. FIG. 3c is the 2D CEDCT image reconstructed from the discrete image data set. FIG. 3d is the contour plot of that 2-D CEDCT image.

FIG. 4c shows the 3D view of the analytic function plotted in FIG. 4a.

FIG. 7A shows an image detected by FLIR ("Forward Looking Infra-Red") detector (NAWCWPNS, China Lake, Calif.; image approved for public release, http://www-.cis.edu/data.sets/nawc_flir).

FIG. 7B shows a zoomed fragment (image of a tank) from the scene in 7A. FIG. 7C shows the same fragment as in FIG. 7B, which is denoised by cutting off all components in the 2-D CEDCT (trigonometric polynomial function) that correspond to the second (higher-order) halves of the frequency terms along x and y axes, and interpolating the image by the thus truncated CEDCT on the grid with spatial resolution of points 3×3=9 times higher than the original grid. FIG. 7D is a 2-D DCT representation in the 2-D frequency space of a 17×17 block fragment from the image shown in FIG. 7B. Each interval step along horizontal or vertical axes corresponds to the increase of the frequency along the respective direction by $\nabla k$ or $\nabla j$ equal to 0.5. Darker corresponds to larger absolute value of the transform coefficient, and the block at the bottom-left corner corresponds to the lowest-frequency term $A_{0,0}$.

FIG. 7E shows an example of another 17×17 block image from the FIG. 7B transformed by DCT into the frequency space.

FIG. 8A: a CT (Computed Tomography) image of a human lung.

FIG. 8B shows a zoomed fragment of an image from (framed in) FIG. 8A. FIG. 8C shows the result of interpolation of the original image of the FIG. 8B to the higher-resolution grid performed by the 2-D CEDCT.

FIG. 8D shows an interpolation of the same fragment shown in FIG. 8B performed by truncated CEDCT. The truncation corresponds to an effective denoising and (zonal) compression of the original image by a factor of 4, since only one quarter of the transform coefficients A,k,j, corresponding to $0 \leq k,j \leq (N-1)/2$ for each N×N image block, is used.

FIG. 9A: contour plot of an analytic function G(x,y) composed of a 2-D Gaussian ellipsoid and two "hot pixels" centred on the knots of the triangular grid shown on the background.

FIG. 9B: 3-D view of an analytic image plotted in FIG. 9B.

FIG. 9C: contour plot of CEDOFT function of Lie group SU(3) constructed from the discrete function $\{Gkn\}$ resulting from sampling of the original analytic function G(x,y) on the triangular grid. The dashed contours correspond to the zero level.

FIG. 9D: 3-D view of the SU(3) CEDOFT image presented in FIG. 9C.

FIG. 9E: contour plot of an image constructed from the same discrete function $\{Gkn\}$ as in FIG. 9C, but using the truncated SU(3) CEDOFT function where ¾-th of the coefficients (corresponding to high frequencies) are discarded.

FIG. 9F: 3-D view of an image shown in FIG. 9E.

FIG. 14A: a 192×192 pixel fragment of the test image "Lena" compressed by thresholding the 2-D DCT coefficients $\{A_{k,j}\}$ in the frequency space to the compression factor C=3.3. Calculations are done in non-overlapping blocks of size 8×8 for the same resolution grid as the original data set (i.e. no interpolation is used). Compression is done by thresholding the transform coefficients in each block, with the threshold chosen as a fixed fraction from the highest transform coefficient in the block, but without subsequent quantization of the remaining transform coefficients.

FIG. 14B: the same fragment as in FIG. 14A compressed to the same compression factor 3.3 in non-overlapping blocs of size 16×16.

FIG. 14C: the same fragment as in FIG. 14A compressed to the compression factor 3.3 in non-overlapping blocs of size 32×32.

FIG. 14D: the same fragment as in FIG. 14A compressed to the compression factor 3.3 in non-overlapping blocs of size 64×64.

FIGS. 20A, 20B, 20C are examples of interpolation similar to the ones in FIG. 19, i.e interpolation without compression of the data set but for non-overlapping blocks, computed for the fragment of the test image "Peppers" (original shown on FIG. 20D).

FIGS. 21A, 21B, and 21C are analogs of the images shown in FIGS. 19A, 19B, and 19C, respectively, when interpolation to 3×3 times higher resolution grid is done using non-overlapping blocks, but applying a moderate compression. The compression factors in these figures correspond to C=3.1 for all block sizes.

DETAILED DESCRIPTION OF THE INVENTION

Figure 1A:
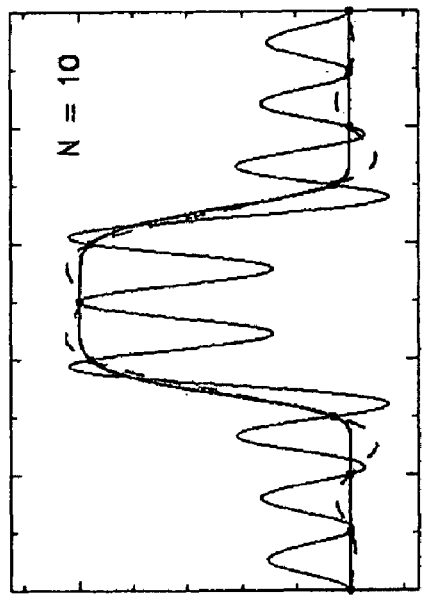
FIGS. 1a and 1b show approximations of 2 analytic functions f(t), plotted by heavy solid lines, which are provided by continuous extensions of the standard discrete Fourier transform, conventionally abbreviated DFT, plotted by thin solid lines, and of DOFT on Lie group SU(2), which coincides with discrete cosine transform (abbreviated DCT), plotted by dashed lines, when the analytic functions are sampled on the grid with the number of equal intervals N=10. Big dots show the discrete function $\{f_k\}$ at the grid points $t_k$.

In the general case, the discrete orbit function transform on Lie group G and the continuous extension of DOFT can be understood as follows. With a selected group G, we have automatically its attributes. The claimed method extensively uses the following ones:

the weight lattice P and its dual in the real space $R^n$;
the finite symmetry group W of P;
corresponding infinite group W-affine;
known algorithms for computing the finite set of s points $\mu$ of P, called W(p), which is invariant under transformation by the group W, which contains element p∈P; it is the W-orbit of the element p in P. The number s is defined by the Lie group;
the fundamental region F of the Lie group. It is a region of given symmetry in n-dimensional space (a segment [0,0.5] in $R^1$; a rectangle or a triangle in 2-dimensional space; a, a 3d-rectangle, tetrahedron, etc. in 3-dimensional space; etc.);

grid of points $\{z_k\}$ in F, denoted F(N), and defined by a chosen positive integer N;

orbit functions $\Phi_p(z)$, which represent the basic functions for (Fourier-like) transform of our method. These functions are defined by Equation (1) above;

the property of discrete orthogonality of orbit functions with different values p and p' on the grid $F_M$, which reads $$\sum_{z \in F(N)} d_z \Phi_p(z) \overline{\Phi_{p'}(z)} = \delta_{p,p'} \cdot D_{N,p} \quad (4)$$

Here overline denotes complex conjugation, and $d_z$ and $D_{N,p}$ are known constants specific for each group G. The orthogonality property is valid for a finite set of functions $\Phi_p(z)$ with p in a discrete set $S_N$ that also makes a grid in the n-dimensional frequency- (or equivalently, wave-number) space. If N is fixed, both grids $S_N$ and $F_N$ are known.

Discrete orbit-function transform of a given discrete function $\{f_k|k=1, \ldots, K\}$ corresponds to its expansion into the series of functions $\Phi_p(z_k)$ evaluated at the points $\{z_k|k=1, 2, \ldots, K\}$ in the form of equation (2). Inversion of this set of K equations with respect to K expansion coefficients $\{A_{p_j}|j=1, 2, \ldots, K\}$ corresponds to forward discrete transform of the discrete function into frequency space. It is done using the orthogonality relations (4).

$$A_{p_j} = (D_{N,p_j})^{-1} \sum_{z_k \in F(N)} d_{z_k} \overline{\Phi_{p_j}(z_k)} f(z_k). \quad (5)$$

The inverse of the DOFT is given by Equation (2), and is therefore called inverse discrete transform. More mathematical details of this discrete transforms on orbit functions of compact semisimple Lie groups are found in Ref. [1].

Continuous extension of DOFT is defined as a continuous function, in the form of trigonometric polynomial function, constructed from the inverse discrete transform given by Equation (2), wherein the discrete variable $z_k \in F(N) \subset F \subset R^n$ is substituted by a continuous variable $z \in R^n$, while the expansion coefficients are calculated through Equation (4) from the discrete forward transform.

The CEDOFT function can be modified by changing the coefficients $A_p$, such as decreasing or completely discarding from the trigonometric series the terms that might be dominated by noise (typically these correspond to high frequencies). Such modified or truncated CEDOFT functions also can be useful for image processing applications, such as for fast suppression of noise that is accompanied by significant compression of the data, and then use of the truncated CEDOFT series to improve the image quality. Examples for such data processing possibility are given by FIGS. 7c, 8d, 9c.

Continuous extension of the discrete transform has been first defined in Ref. [6] on the example of compact simple Lie group SU(2) for 1-dimensional case, and semisimple Lie group SU(2)× . . . ×SU(2) of rank n for n-dimensional rectangular grids. Implementation of the SU(2) CEDOFT for image interpolation, denoising, and compression have been proposed in Refs. [7,8]. Discrete transforms and their continuous extensions for other Lie groups of rank 2 are considered in Refs. [9,10,11].

Example

The Case of Lie Group SU(3) for Triangular Grids

Figure 25:
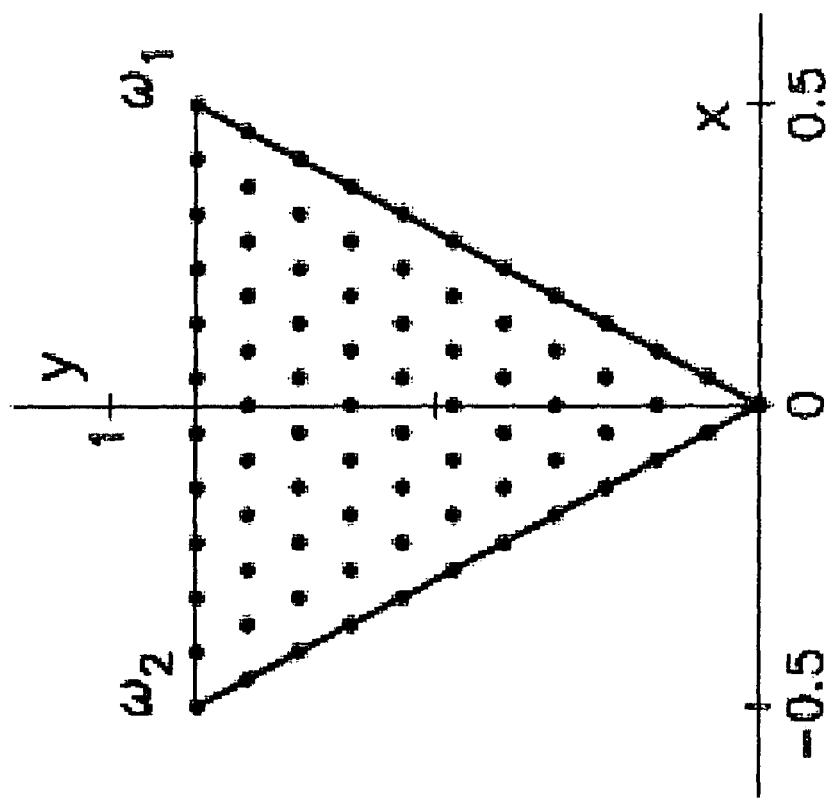
FIG. 25: fundamental domain F, fundamental weights $\omega 1$ and $\omega 2$ of SU(3), and the grid F(N) of points z(s,m) finite adjoint order N=11 in F.

FIG. 25 shows the pair of fundamental weights ($\omega_1$, $\omega_2$), of the SU(3) group, which define the weight lattice P through linear combination $p = a\omega_1 + b\omega_2 \equiv (a,b)$ with integer numbers a and b. In 2-dimensional space it is convenient to use a pair of 1-dimensional indices, here a and b, instead of a single 2-dimensional index, here p. The fundamental region F for this Lie group is an equilateral triangle enclosed between $\omega_1$ and $\omega_2$. The W-orbit of the element p consists, in general case, of 6 vector points that could be written in the basis of fundamental weights as $W(p)=\{(a,b),(b,-a-b),(-a-b,a),(-a,a+b),(a+b,-b),(-b,-a)\}$.

In Cartesian coordinates (x,y) shown in FIG. 25, the orbit functions can be expressed explicitly as $$\text{Re}\Phi_{a,b}(x, y) = 2\cos\left(2\pi y \frac{a+b}{\sqrt{3}}\right)\cos\left(2\pi x \frac{a-b}{3}\right) + \quad (5)$$
$$2\cos\left(2\pi y \frac{a}{\sqrt{3}}\right)\cos\left(2\pi x \frac{2b+a}{3}\right) + 2\cos\left(2\pi y \frac{b}{\sqrt{3}}\right)\cos\left(2\pi x \frac{2a+b}{3}\right),$$

$$\text{Im}\Phi_{a,b}(x, y) = 2\cos\left(2\pi y \frac{a+b}{\sqrt{3}}\right)\sin\left(2\pi x \frac{a-b}{3}\right) +$$
$$2\cos\left(2\pi y \frac{a}{\sqrt{3}}\right)\sin\left(2\pi x \frac{2b+a}{3}\right) + 2\cos\left(2\pi y \frac{b}{\sqrt{3}}\right)\sin\left(2\pi x \frac{2a+b}{3}\right),$$

where a and b are non-negative integers.

Figure 1B:
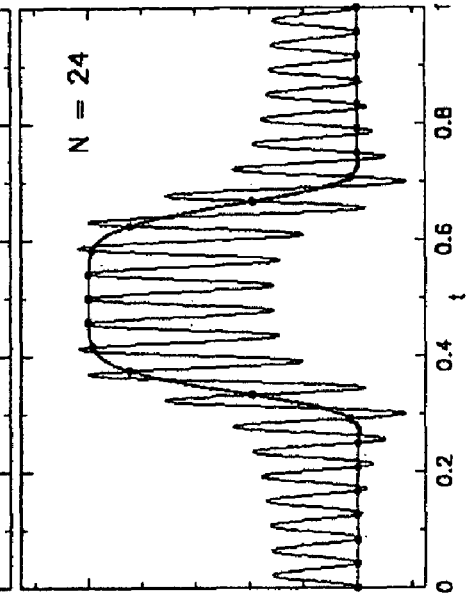
Figure 1C:
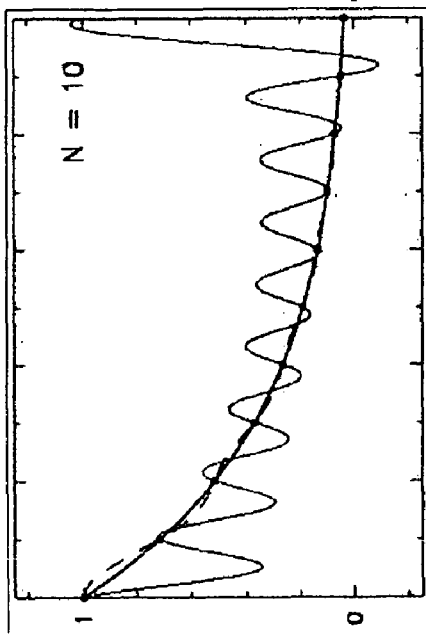
FIG. 1c shows similar approximations for the function shown in FIG. 1a when the resolution of the grids is increased to N=30.
Figure 1D:
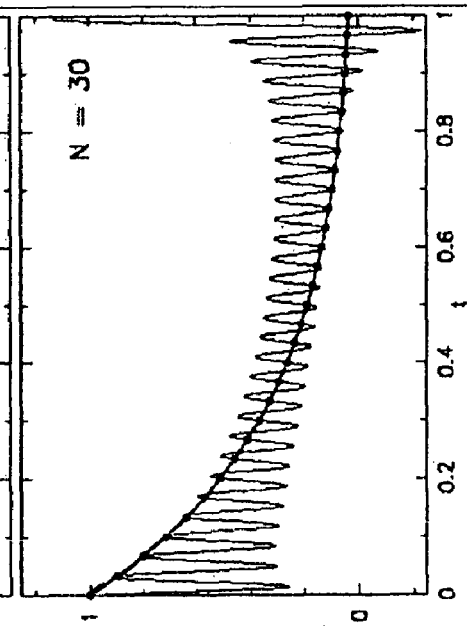
FIG. 1d shows similar approximations for the function shown in FIG. 1d when the resolution of the grids is increased to N=24.
Figure 2A:
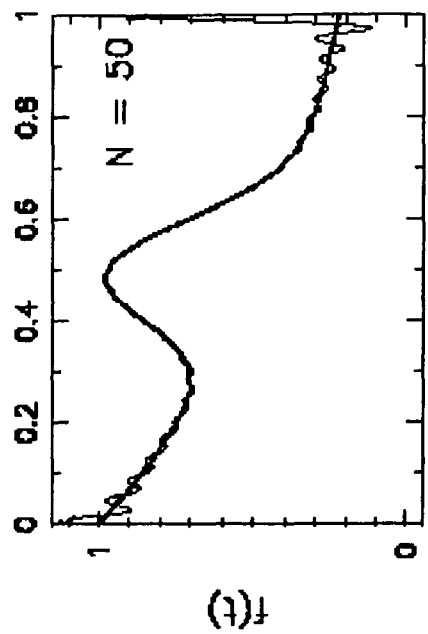
In FIG. 2a heavy solid curve shows a continuous function f(t), sampling of which on N=8 interval 1-D grid produced the discrete function $\{f_k | k=0, 1, \ldots, N\}$. The dashed curve is the CEDCT constructed from that function, the thin solid curve is the continuous extension of "real DFT", and 3-dot—dashed curve corresponds to the Shannon interpolation function constructed on the basis of the discrete function $\{f_k\}$.
Figure 2B:
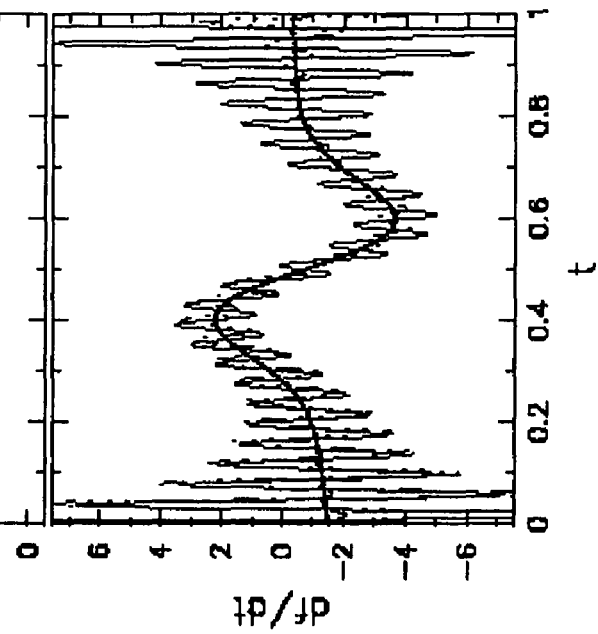
FIG. 2b shows the same as the FIG. 2a, but when the function f(t), sampled on the grid with N=50 intervals.
Figure 2C:
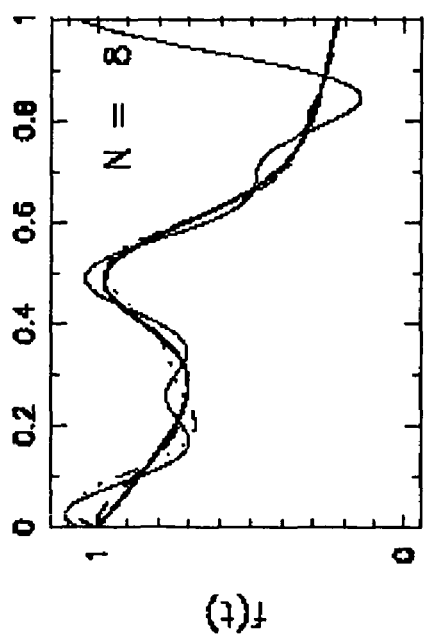
Figure 2D:
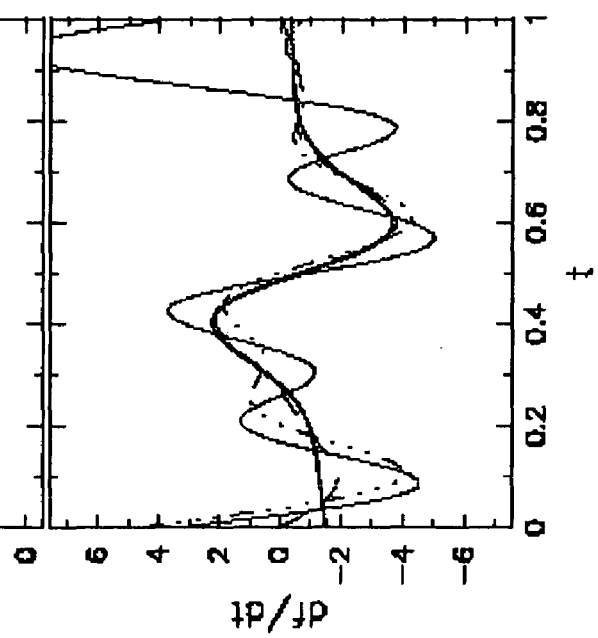
FIG. 2d shows the same derivative functions as shown in FIG. 2c, when the grid resolution is increased to N=50.
Figure 4C:
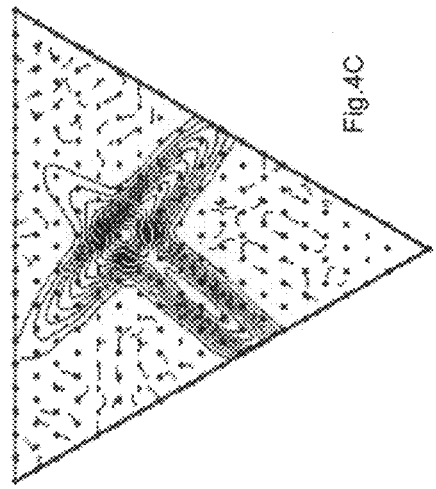
Figure 4D:
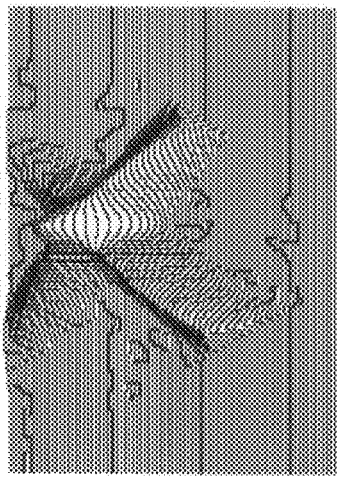
FIG. 4d is the 3D view of the CEDOFT plotted in FIG. 4b.
Figure 4A:
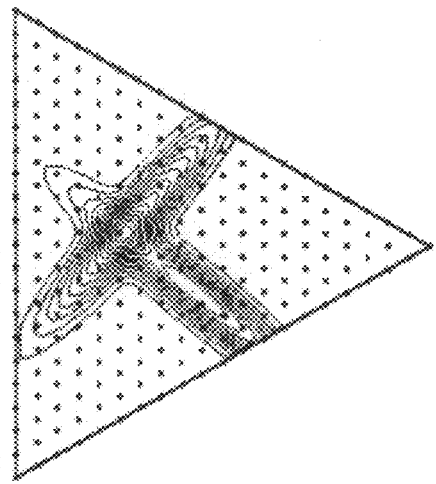
FIG. 4a shows the contour plot of a 2D analytic function in the form of superposition of 2 Gaussian distributions.
Figure 4B:
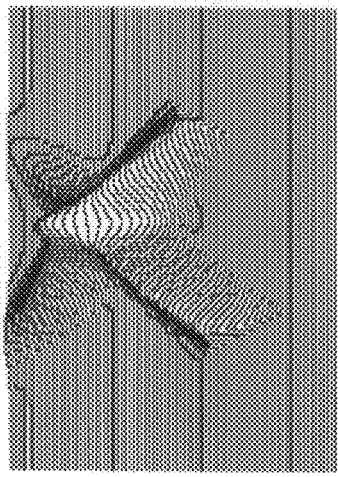
FIG. 4b shows the contour plot of the CEDOFT on Lie group SU(3), which is constructed from the discrete function that results from sampling of the analytic function on the shown triangular grid.

For a given N the principal discrete grid F(N), on which the discrete function $\{f_k\}$ is given, could be conveniently defined in the basis dual to fundamental weights (in case of SU(3) group these bases coincide), as $z_k=(s\omega_1+m\omega_2)/N \equiv z_{(s,m)}$, where s and m are integer numbers satisfying condition $s,m \geq 0$ and $s+m \leq N$. The total number of points in this grid is $K=(N+1)(N+2)/2$. The grid shown in FIGS. 1a and 1b corresponds to the case of N=11, i.e. N corresponds to the number of equal subintervals along the basis vectors. The principal grid S(N) in the frequency space that defines the 2-dimensional wave numbers belongs to the weight lattice P of the group, and has very similar triangular structure. It consists of the elements $p=a\omega_1+b\omega_2 \equiv (a,b)$ with integer numbers a and b that satisfy the condition $\{a,b \geq 0, \text{ and } a+b \leq N\}$. There is a known possibility to change this basic set of frequencies of the trigonometric harmonics used in the transform, but this is the one that provides the smallest possible harmonic frequencies for the given number N, and the best performance of the method.

The DOFT in case of SU(3) reads $$A_{a,b} = \frac{d_{a,b}}{108N^2} \sum_{s,m \geq 0}^{s+m \leq N} d_{s,m} \overline{\Phi_{a,b}(x_{s,m}, y_{s,m})} f(x_{s,m}, y_{s,m}), \quad (6)$$

where $(x_{s,m}, y_{s,m})$ are Cartesian coordinates of the point $z_{(s,m)}$ running over the grid F(N), and $d_{a,b}$ and $d_{s,m}$ are the multiplicity factors equal to 6, 3, or 1, depending on the indices a and b or s and m (see Ref. [10]). The Continuous Extension of DOFT represents a continuous function in the form of a trigonometric polynomial of n=2-dimensional (in this case) variable $z \in R^2$.

$$g(z) = \operatorname{Re} \sum_{a,b \geq 0}^{a+b \leq N} A_{a,b} \Phi_{a,b}(z) \tag{7}$$

We note that this function coincides with the discrete function $\{f_k = f(z_k)\}$ at all points of the grid F(N), while between the grid points it would not generally coincide with the continuous function f(z), the sampling of which on the grid had originated $\{f_k\}$. Therefore g(z) that denotes CEDOFT is to be distinguished from the f(z). Important notice is, however, that g(z) approximates well the smooth original function f(z), and can be effectively used for interpolation of the discrete image at any point (or set of points) between the points of the original grid.

Example

The Case of SU(2) and its Multi-Dimensional Generalizations

For the group SU(2), which is of rank n=1, the fundamental region is reduced to the 1-D segment, $F \equiv [0, \frac{1}{2}]$. The W-orbit of an element z∈F of this group consists in general form only of 2 elements, $W(p) = \{p, -p\}$. Orbit functions (1) are then reduced to the sum of 2 exponential functions resulting in $\Phi_p(\theta) = 2\cos(2\pi p z)$. The grid $F_N$ corresponds to equidistant set of points corresponding to N equal subdivisions of the fundamental region, i.e. $\{z_k = k/2N | k = 0, 1, \ldots, N\}$. On this grid the orbit functions are reduced to $\cos(\pi p k/N)$. This coincides with the transform basis of the known discrete cosine transform (DCT), or more exactly, the DCT-1 (see [6]). The forward transform for the image dataset $\{f_k | k=0, 1, \ldots, N\}$ resulting from sampling of a function f(x) defined on a segment [0,X] (i.e. grid corresponds to $X_k = kX/N$) is $$A_p = \sum_{k=0}^{N} \frac{C_{N,p} C_{N,k}}{2N} \cos\frac{\pi p k}{N} f_k, \quad (k = 0, 1, \ldots, N), \tag{8}$$

where $C_{N,m} = 1$ for m=0 or m=N, and $C_{N,m} = 2$ otherwise. The continuous extension of the DOFT, which for convenience we call CEDCT, is then given by simple trigonometric polynomial in the form $$g(x) = \sum_{k=0}^{N} A_p \cos\frac{\pi p x}{X}, \tag{9}$$

where x is the continuous variable.

Consider a 2-dimensional discrete image dataset $\{f_{kj}\}$ that results from sampling of a continuous function f(x,y) with $\{0 \leq x \leq X, 0 \leq y \leq Y\}$ on a rectangular grid of points $(x_k, y_j)$, where $\{x_k = kX/N | k = 0, 1, \ldots, N\}$, $\{y_j = jY/M | j = 0, 1, \ldots, M\}$. A trigonometric polynomial $$g_{NM}(x, y) = \sum_{n=0}^{N} \sum_{m=0}^{M} A_{nm} \cos\frac{\pi n x}{X} \cos\frac{\pi m y}{Y} \tag{10}$$

where the coefficients are calculated through the discrete transform, $$A_{nm} = \sum_{i=0}^{N} \sum_{j=0}^{M} \frac{C_{N,k} C_{N,n} C_{M,j} C_{M,m}}{4NM} \cos\frac{\pi n k}{N} \cos\frac{\pi m j}{M} f_{kj} \tag{11}$$

represents the CEDOFT function for the Lie group SU(2)×SU(2). This represents the continuous extension of 2-D DCT-1.

A 3-D CEDCT for discrete function $\{f_{ijs}\}$ has a similar explicit form:

$$g_{NML}(x, y, z) = \sum_{n=0}^{N} \sum_{m=0}^{M} \sum_{l=0}^{L} A_{nml} \cos\frac{\pi n x}{X} \cos\frac{\pi m y}{Y} \cos\frac{\pi l z}{Z}, \tag{12}$$

where the coefficients are calculated through the discrete forward 3-D transform, $$A_{nml} = \sum_{i=0}^{N} \sum_{j=0}^{M} \sum_{s=0}^{L} \frac{C_{N,k} C_{N,n} C_{M,j} C_{M,m} C_{L,s} C_{L,l}}{8NML} \times \cos\frac{\pi n k}{N} \cos\frac{\pi m j}{M} \cos\frac{\pi l s}{L} f_{ijs} \tag{13}$$

Generalization of the CEDCT for n-dimensional rectangular grids with n>3 is apparent from this construction.

Note that in standard JPEG another version of DCT is used, namely, DCT-2. The basic, i.e. 1-dimensional, version of this transform is given by (see Ref. [12])

$$A_p = \sum_{k=0}^{N} \frac{c_{N,k} c_{N,p}}{2(N+1)} \cos\frac{\pi p(k+1/2)}{N+1} f_k, \quad (k = 0, 1, \ldots, N), \tag{14}$$

where the coefficients $c_{N,m}$ are slightly different from $c_{N,m}$, namely, $c_{N,m} = 1$ for m=0, and $c_{N,m} = 2$ otherwise. Here we use N for the number of intervals, thus (N+1) is the number of pixels. Note that the discrete argument k in this series is shifted by ½ compared with DCT-1. So is also the inverse DCT-2, which can be written as:

$$f_k = \sum_{k=0}^{N} A_p \cos\frac{\pi p(k+1/2)}{N+1}, \quad (p = 0, 1, \ldots, N) \tag{15}$$

Keeping the argument $x_k = kX/N$ as in case of DCT-1, continuous extension of this DCT-2 can be then presented as $$g(x) = \sum_{k=0}^{N} A_p \cos\left(\frac{\pi p(x+\Delta)}{X}\left(1 - \frac{1}{N+1}\right)\right), \tag{16}$$

where $\Delta = 1/(2N)$. Effectively, this represents a shift of the grid F(N) in the imaged space by one half of the grid interval and resealing of the argument of the CE of the DCT-1 by a factor a=(1−1/(N+1)).

An important notice is that harmonic order of wave functions (i.e. of exponentials) in the trigonometric polynomial series that make the CEDOFT functions is not generally represented by integer numbers, unlike the case of standard Discrete Fourier Transform. The grid S(N) that defines the harmonic order of the basis functions of the DOFT transform has a spacing more dense than it is in the case of DFT of the same spatial dimension. In practical terms this results in construction of a continuous band-limited trigonometric function g(z) with the maximum frequency that satisfies the Nyquist sampling rate (see Ref. [7] for detailed explanation). The good properties of the family of Continuous Extensions of discrete trigonometric transforms unified here as DOFT are explained by this very property of the basis functions.

FIGS. 1a to 1d demonstrate approximations of 2 analytic functions f(t) (shown by heavy solid lines) of one-dimensional real variable t∈[0,1] which are provided by continuous extensions of conventional discrete Fourier transform, abbreviated DFT (thin solid curves) and of DOFT (dashed curves) on the Lie group SU(2), which coincides with the known discrete cosine transform known as DCT (or more exactly, with DCT-1). Big dots show the values of the discrete functions {fk} that result from sampling of f(t) at (N+1) equidistant points {tk=k/N} of one-dimensional grid normalized here to the segment [0,1] for convenience. The CEDCT function $g_N(t)$ rapidly converges to f(t) with the increase of N, while the oscillations in CEDFT do not diminish. The reason is in aliasing connected with high-frequency harmonics, exceeding the Nyquist rate, which are always present in the formal continuous extension of standard DFT. The latter is expressed as $$g(t) = \text{Re} \sum_{p=0}^{N-1} u_p e^{i2\pi pt},$$

where $\{u_p\}$ are the conventional N-point DFT coefficients $$u_p = \frac{1}{N} \sum_{k=0}^{N-1} f_k e^{-i\frac{2\pi}{N}kp}.$$

As explained in Ref. [6], the reason for profound oscillations is that the transform basis of DFT consists of trigonometric functions with frequencies up to p=(N−1). The amplitude of high-frequency terms for DFT is significant at all N because of the relation $u_p = \overline{u_{N-p}}$, where overline stands for complex conjugation. Therefore the CEDFT formally represents a band-limited continuous function the Nyquist sampling rate of which would require at least 2(N−1) points to avoid aliasing, whereas only N points are available.

The aliasing is avoided if one takes care of the harmonics in DFT exceeding frequency (N/2) using the above noted relation between DFT coefficients to construct the "real DFT" composed only of harmonics of order p≦N/2, and only then constructing continuous extension of that that transform referred to as "real DFT".

It will be appreciated that the continuous cosine transform function is an orbit function transform and thus provides a good interpolation between the discrete values of the image dataset. On the other hand, the continuous extension Fourier series, that faithfully intersects each discrete value of the dataset just like the continuous extension cosine transform, oscillates between the discrete values and thus is not efficient for interpolation purposes. It can further be shown that the continuous extension of an orbit function transform has a slope or first derivative that also is a fair approximation of the slope or first derivative of the image dataset. From the simple one-dimensional illustration of FIGS. 1a to 1d, one can appreciate that the continuous extension orbit function transforms in higher dimensions are likewise efficient for interpolation purposes.

It can also be appreciated from the above equations that using the continuous extension orbit function to calculate the grid points for an image dataset having a different spatial resolution from the source image (and same number of grid points) is essentially the same effort as for calculating inverse discrete transform values. Such inverse discrete cosine transform (DCT) calculation is done when decompressing an image compressed using DCT. The DCT is used in standard JPEG compression and the inverse DCT in standard JPEG decompression.

FIGS. 2a to 2d compare quality of approximations to the original analytic function f(t) and to its derivative df/dt (both shown by heavy solid curves) that are provided by CEDCT (dashed curves), CE of "real DFT" (thin solid curves), and by Shannon interpolation formula for finite discrete sequences based on sine function (3-dõtdashed curve). With increasing density of grid points from N=8 to N=50 all of these 3 interpolations do converge to f(t). But only the derivative of CEDCT function $g_N(t)$ converges to df/dt. The differentiability property of CEDOFT is proven in Ref. [6].

FIGS. 3a to 3d show the quality of reconstruction of an analytic test image resulting from sampling of a 2-D function f(x,y) on a rectangular grid of normalized size x,y∈[0,1]. The function, contour plot of which is shown on the bottom left panel, is composed of sum of two Gaussian 2-D distributions with effective widths of each, that is defined by dispersions σ, equal to the length 1/N of grid cells. Although the grid is rather coarse for such an image, as apparent from the gray-scale discrete image shown on the upper-left panel, both grayscale diagram and the contour plot representations of 2-D CEDCT function g(x,y) shown in FIGS. 3b and 3d demonstrate good quality of reconstruction of the original function f(x,y) by g(x,y). Difference between these two becomes noticeable only at the lowest contour levels (of less than 5% of the image amplitude) in the regions where f(x,y) drops to zero intensity level.

FIGS. 4a to 4d show an example of interpolation quality for a similar analytic image formed on a non-rectangular grid, in this case equilateral triangular, or else hexagonal, grid. The interpolation is performed by CEDOFT in the case of Lie group SU(3).

Figures 5A, 5B:
FIG. 5a shows a fragment of the 256×256-pixel test image "Lena" strongly zoomed to reveal the pixel sizes.
FIG. 5b shows interpolation of this image to 5×5 higher resolution using 2-D CEDCT, i.e. the CEDOFT on Lie group SU(2)× SU(2).

The high potential of application of CEDOFT functions for interpolation of real images is demonstrated in FIGS. 5a and 5b. Here the CEDOFT of the Lie group SU(2)×SU(2), i.e. the 2-dimensional CEDCT is applied for interpolation of the test image "Lena". FIG. 5b demonstrates the effect of interpolation of a strongly zoomed 81×81-pixel fragment of the original 256×256 resolution image "Lena" shown on the left. The good quality provided by such interpolation is apparent.

The actual surface density of points, i.e. the resolution, used in FIG. 5b is 5×5=25 times larger than of the original data set. Meanwhile, the real sizes of the data sets representing these 2 images in the frequency space are in exactly equal. This is because the CEDCT function uses exactly the same number of DCT transform coefficients $\{A_{nm}|n=0, 1, \ldots, N-1; m=0, 1, \ldots, M-1\}$ (assuming a rectangular image of N×M pixel size) as the original image $\{G_{nm}\}$. The frequency content in these images is exactly the same.

It is important therefore that in principle an image interpolated by CEDCT, or by multi-dimensional CEDOFT of other Lie group in general, to spatial resolution much higher than the original, could be then compressed in the frequency space by a compression algorithm like JPEG to the original image size using the DOFT of the same Lie group that had been used for interpolation. It is important that such compression is lossless. It could be repeated as many times as needed without degradation of the quality of the image. The compression factor for lossless compression of the zoomed image in FIG. 5b would be as high as 25 even without using further on standard lossless compression techniques like entropy coding. The image could be thus compressed, stored or transmitted, and again "continuously" zoomed to any spatial size whenever needed.

Figure 6A:
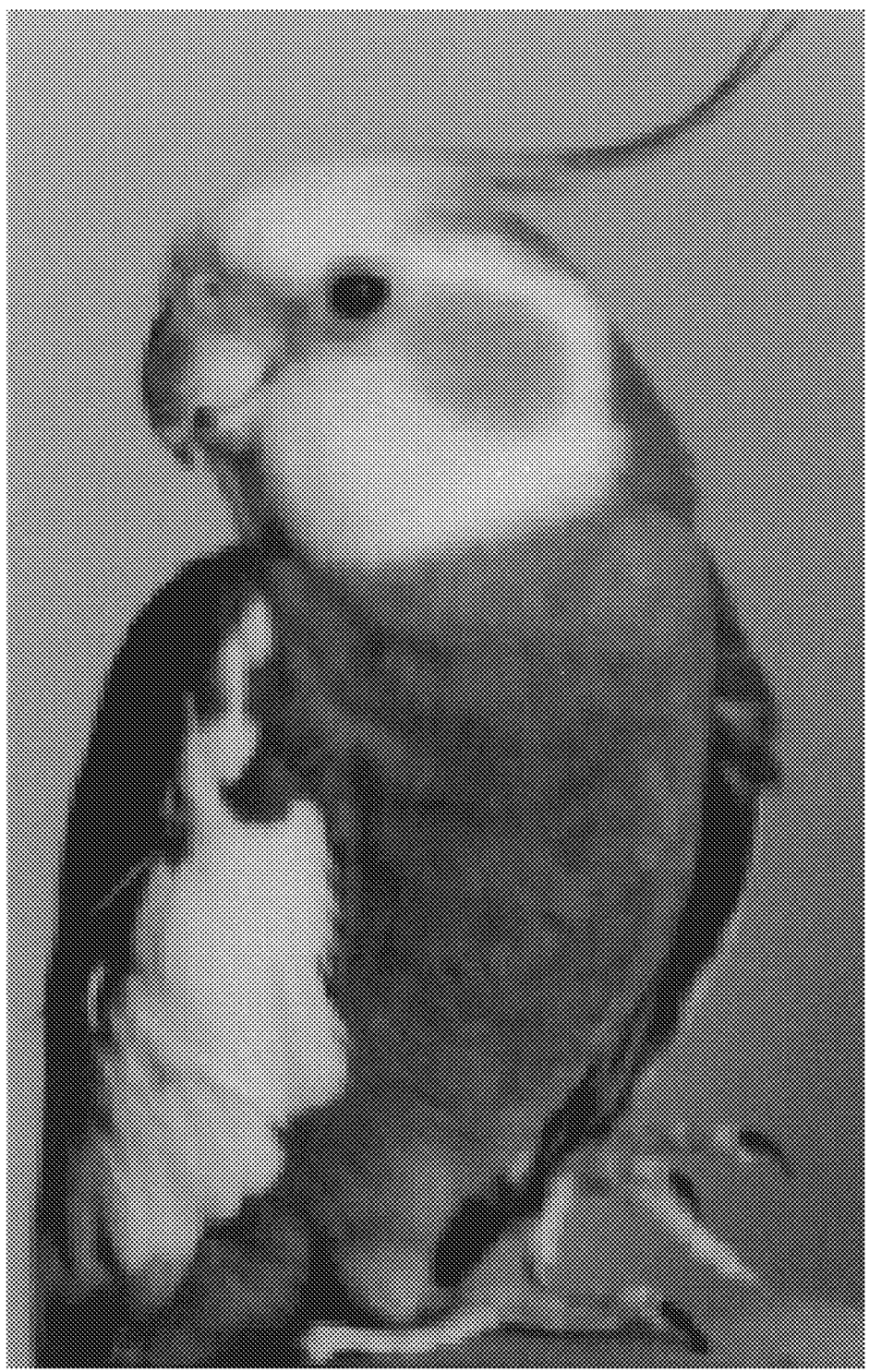
FIG. 6A shows a 160×256 pixel fragment from the 256× 256-pixel test image "Bird".
Figure 6B:
FIG. 6B shows interpolation of this image to 4×4 higher resolution using 2-D CEDCT.

FIGS. 6A and 6B represent another example of interpolation provided by CEDCT for real images of good quality. Here the 256×256 resolution test image "Bird" is used in FIG. 6A. It is also important that for DCT fast computation algorithms of FFT type ("fast Fourier transform") are developed and can be applied both for calculation of the transform coefficients and for interpolation to higher resolutions. Interpolation calculations can be done by methods of FFT if the resolution is increased by an integer multiplication factor.

Example of 2D Image Zoom and Denoising

FIGS. 7a to 7c demonstrate that CEDOFT interpolation can be also effective for processing of noisy images. Here the 2-D CEDCT function is used to denoise an image taken by FLIR ("Forward Looking Infra-Red") detector. Here in the truncated CEDCT function the high frequency modes corresponding to frequencies k>N/4 have been simply discarded, whereas the maximum frequency in DCT along each of frequency axes is N/2. This procedure has resulted in suppression of the "horizontal" noise intrinsic to FLIR detectors (see Ref. [8]), which has clearly improved the quality of the CEDCT-interpolated image. Further zooming into details of the processed image using CEDOFT could reveal additional details. It is important that the denoising is straightforward and fast, if one uses FFT-type algorithms for calculations of the DCT and CEDCT. It is also accompanied by significant compression of the factual image size, such as by a factor of 4 in FIG. 7C.

The reason for improvement of the quality of noisy images by means of simple discarding the high-frequency terms in CEDOFT functions can be understood from FIGS. 7D and 7E where the frequency contents of two 17×17 size blocks from the scene shown in FIG. 7B are shown. The most meaningful part of the image is concentrated at the lower-frequency corner of the image in the frequency space, while the Gaussian random noise dominates the image at high frequencies (see Refs. [7,8] for more details).

FIGS. 8B, 8C and 8D illustrate interpolation and zooming of a small fragment of the original medical image (CT scan) shown in FIG. 8A using 2-D CEDCT. The images in FIGS. 8C and 8D represent interpolations of the fragment in FIG. 8B that correspond to non-truncated and truncated (compressed by a factor of 4) CEDCT interpolations to 4×4 times higher resolution grids. In the case that the zoom process is done from a compressed image dataset, the initial step of calculating the DCT coefficients is already done during compression, and the additional calculation of pixel values is the only extra effort to obtain the zoomed image. It will be appreciated that this can be more desirable than higher-order pixel interpolation schemes that analyze pixels in the image space and attempt to define accurate interpolation functions that are used solely for the purpose of interpolating pixels, and in many interpolation schemes the interpolation function is re-determined for each interpolated pixel.

Fast and effective procedure of denoising of noisy imagery shown in FIGS. 7C and 7D also applies to CEDOFT functions of other Lie groups that generally correspond to n-dimensional grids of non-rectangular symmetries. This is demonstrated in FIG. 9 and FIG. 10 using the example of denoising of an image formed by sampling of an analytic 2-D Gaussian function on an equilateral triangular grid, and superposing additionally 2 'hot pixels', or discrete delta-functions, at the positions of 2 individual pixels. Representation of the image by the truncated CEDOFT function essentially removes the hot pixels and the waves from the scenes in FIGS. 9A, 9B, 9C and 9D, and recovers the meaningful part of the original analytic image. More details are found in Refs [9,10]

Figure 10:
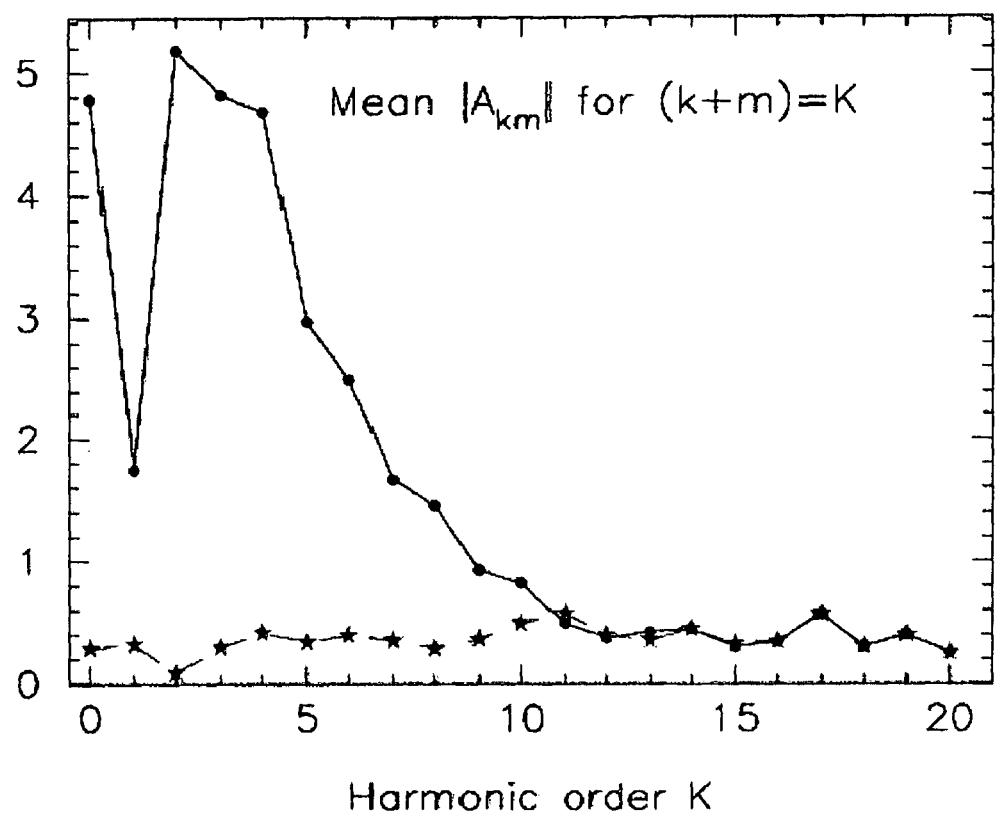
FIG. 10: mean values of the SU(3) DOFT coefficients Ak,m corresponding to different frequency modes (k+m) for the image dataset shown in FIGS. 9a to 9f. The stars correspond to the transform coefficients of the 2 hot pixels in this image alone.

The DOFT image of the original image shown on FIGS. 9A and 9B is dominated by the contribution of the noise, i.e. by the DOFT mainly of the 2 hot pixels corresponding to the second half of the frequencies, (k+m)>N/2, as evidenced by FIG. 10.

Examples

Comparing with Other Interpolation Algorithms

The computation time of the transform, as well as of interpolation calculations, by the CEDCT/DOFT algorithm is very competitive. In image space, pixel interpolation is usually performed using different algorithms, such as bilinear or bicubic. The latter belongs to the type of high-order polynomial interpolation which provides better interpolation quality, but requires generally 16 or more operations of multiplications. This operation is much more time-consuming than the addition operation, and it generally defines most of the interpolation computation time. Bilinear interpolation for 2-D images uses only 4 nearest neighbor pixel values, and correspondingly only 4 multiplication operations per interpolated point. It is significantly noticeably worse than the high order polynomial interpolations, but is much faster than the latter. Therefore bilinear interpolation is preferred in many practical applications where quality of interpolation is to be sacrificed for the interpolation speed.

Figure 11A:
FIG. 11B shows a 145×105 pixel zoomed image of an eye of a croc shown on FIG. 11A. In the FIG. 11C that image is interpolated to 7×7 times higher resolution grid by the CEDCT function. For comparison, in the FIG. 11D an interpolation of the croc eye by the "Lanczos" interpolation algorithm, which is respected as one of the best high-order polynomial type interpolation algorithms is shown (from http:// www.americaswonderlands.com/image_resizing.htm).
Figure 11B:
Figure 11C:
Figure 11D:

The quality of interpolation provided by CEDOFT, in particular by the 2-D CEDCT, is comparable with the quality of bicubic, bicubic spline, or other high-order polynomial interpolation algorithms. This is demonstrated by FIGS. 11C and 11D, which compare interpolations provided by 2-D CEDCT (FIG. 11C) and by the Lanczos interpolation (FIG. 11D), considered as one of the best high-order polynomial-type interpolation algorithms. At the same time, the speed of interpolation using even blocks of size as large as of order 100× 100 is significantly higher than for polynomial algorithms, and competes with the speed of bilinear interpolation.

DCT and inverse DCT can be computed with using high speed computation algorithms known as a class of FFT (Fast Fourier Transform) algorithms (e.g. see Refs. [14,15]), and its various modifications. The number of multiplications M required for computation of k-dimensional FFT of N×N×...×N block data set by Radix-2 algorithm (that implies $N=2^p$ with an integer p) is about $$M = (kN^k \log_2 N)/2 = \frac{kp}{2} N^k. \tag{17}$$

This means that number of multiplications m per point in case of 2-D data set is only about p, which means only a logarithmic increase of m with increasing size N of the blocks. For 16×16 block size equation (17) predicts m=4, which increases only to m=7 for 128×128 size block. In fact, more sophisticated algorithms can be applied, which may further reduce these numbers by a factor 2 to 3. Thus, the Table 7.1 of Ref. [14] tells that the number of multiplications per point by the so called polynomial transform (not to be confused with polynomial interpolation) algorithm is only m=1.69 for N=16, and m=4.67 for N=128. The latter is quite comparable with 4 multiplications needed for bilinear interpolation, and is much smaller than 16 or more multiplications needed for high-order bicubic etc. interpolations per point. Note that interpolations by k-D CEDCT can be implemented by FFT using the so-called zero-padding method. It formally increases the number of transform coefficients, assuming 0 values for the coefficients $A_s$ with indices s>N, which therefore does not increase the number of non-trivial multiplications for higher-resolution grid calculations.

The advantage of multidimensional CEDCT interpolation is further increased for high-dimensional data sets. Thus, the number of multiplications per interpolation point for 3-D data set will increase to 8 for bilinear-type interpolation (involving calculations with 8 nearest points of the initial grid), and to 16×4=64 for a bicubic analog in 3-D data space. Meanwhile, as follows from Equation (17), the number of multiplications per point for 3-D CEDCT will increase only by a factor 1.5 for the same primary size N of 3-D block.

Examples

Impact of Larger Block Sizes

Figure 12A:
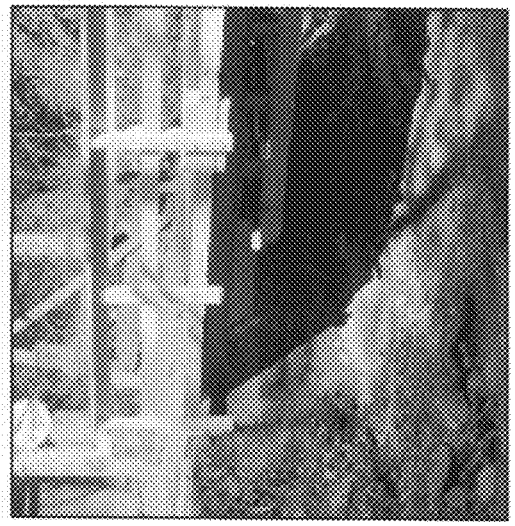
FIG. 12A: a 224×224 pixel-size fragment of the original 512×512 resolution test image "Bridge".
Figure 12B:
FIG. 12B: 2-D CEDCT interpolation of the image in FIG. 12A to 448×448 pixel resolution image.
Figure 12C:
FIG. 12C: the image shown in FIG. 12A compressed to a compression factor C=35 by the method of thresholding quantization, and reconstructed on the 448×448 resolution grid by the thus compressed CEDCT. Interpolations are done by subdividing the original image dataset into blocks of size 33×33 overlapping in 1 pixel at the adjacent blocks.
Figure 12D:
FIG. 12D: the image as in FIG. 12A compressed to the same compression factor C=35 and interpolated by CEDCT to the same 448×448 resolution grid as in FIG. 12C, but when the calculations are done in blocks of 9×9 pixel size.
Figure 13A:
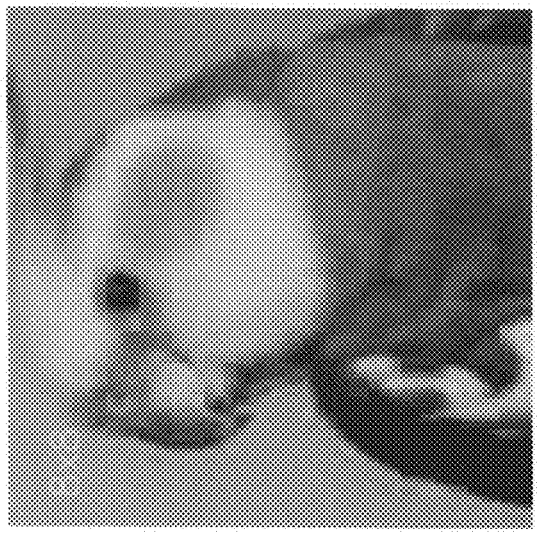
FIG. 13A: a 128×128 pixel fragment of the test image "Bird" compressed by thresholding the 2-D DCT coefficients $\{Ak,j\}$ in the frequency space (without quantization) to the compression factor C=4.1, when the calculations are done in non-overlapping blocks of size 8×8, and no interpolation is applied. The threshold for discarding the transform coefficients in each block is defined as a certain percentage fraction from the maximal transform coefficient in that block.
Figure 13B:
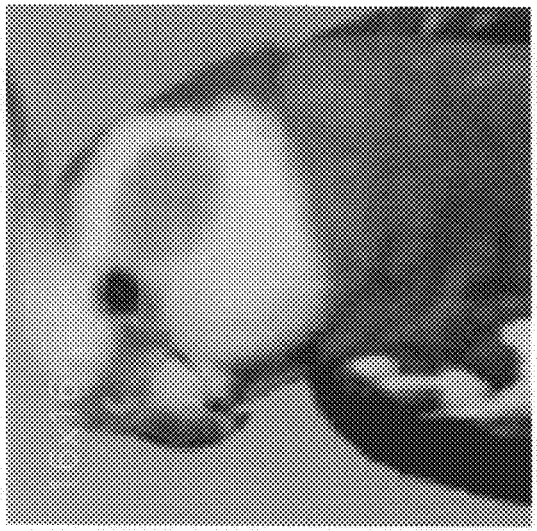
FIG. 13B: same fragment as in FIG. 13B compressed to the same compression factor 4.1, but when computations are done in individual non-overlapping blocks of 16×16 size.
Figure 13C:
FIG. 13C: same fragment compressed to the same ratio 4.1 as in FIG. 13B, but for calculations in blocks of size 32×32
Figure 13D:
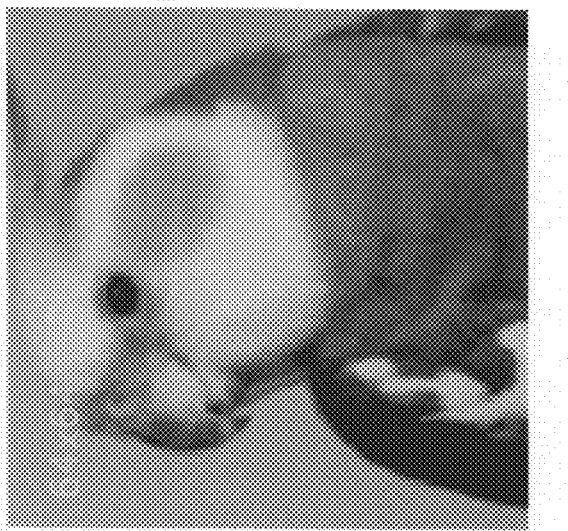
FIG. 13D: same fragment compressed to the same ratio 4.1 as in FIG. 13C, but when calculations are done in blocks of size 64×64.
Figure 15B:
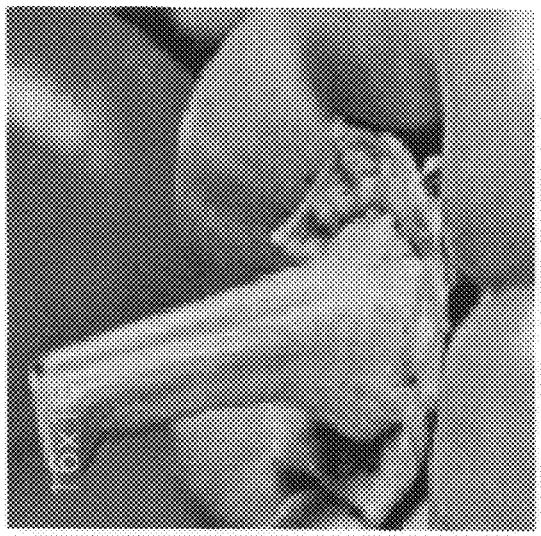
FIG. 15B: the same fragment compressed to the compression factor 3.3 in non-overlapping blocs of size 32×32.
Figure 15D:
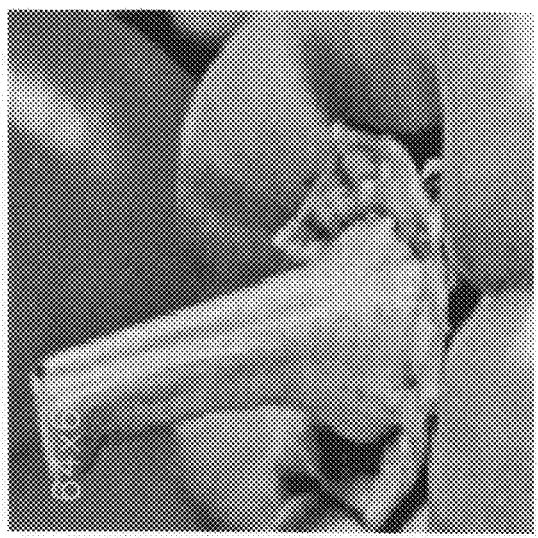
FIG. 15D: the same fragment as compressed to the compression factor 3.3 in non-overlapping blocs of size 64×64.
Figure 15A:
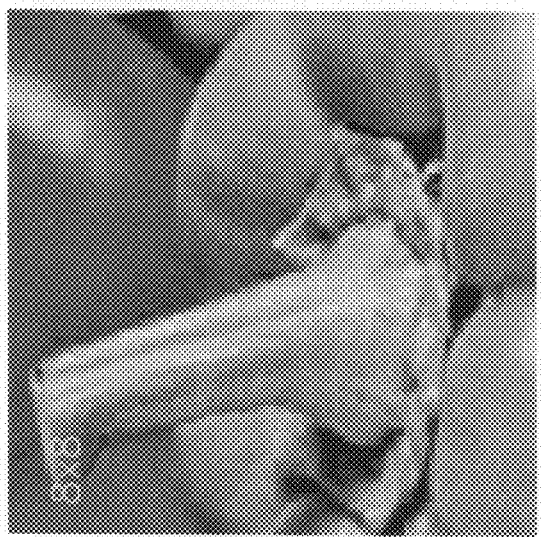
FIG. 15A: a 128×128 pixel fragment of the 512×512 resolution test image "Peppers" compressed by thresholding (without quantization) to the compression factor C=3.3. Calculations are done in non-overlapping blocks of size 8×8, without interpolation between the grid points to change the resolution of the original data set.
Figure 15C:
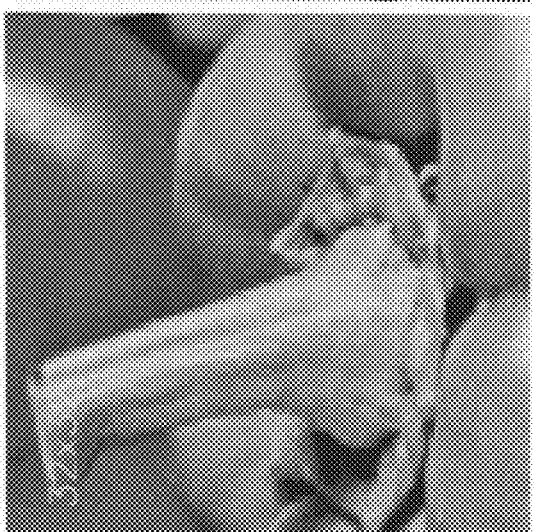
FIG. 15C: the same fragment as in FIG. 15A compressed to the compression factor 3.3 in non-overlapping blocs of size 32×32.
Figure 16A:
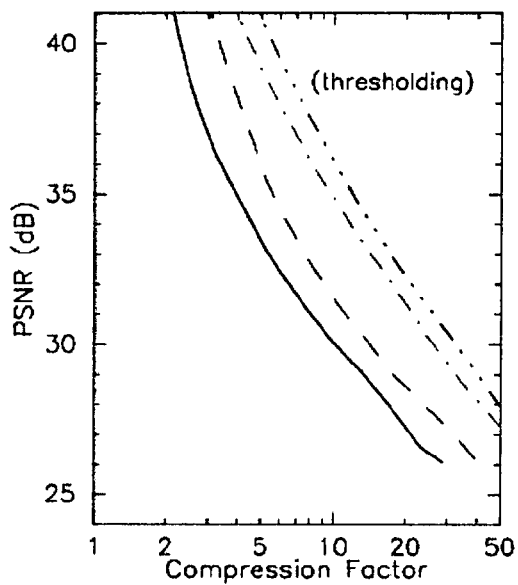
FIG. 16A: Peak signal-to-noise ratio (PSNR) at different compression factors C for the fragment of test image "Bird" shown on FIG. 13. The solid, dashed, dot-dashed and 3-dot-dashed lines show PSNR when calculations are done with non-overlapping blocks of size 8×8, 16×16, 32×32, and 64×64 pixels, respectively. Compression is done by thresholding the transform coefficients in each block, with the threshold chosen as a fixed fraction from the highest transform coefficient in each block, but without subsequent quantization of the remaining transform coefficients.
Figure 16B:
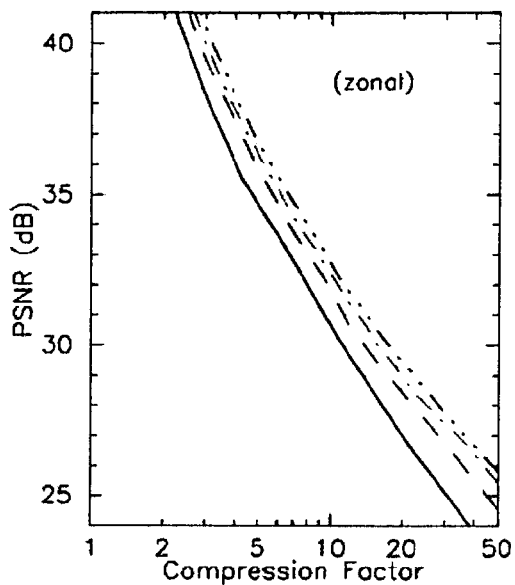
FIG. 16B shows PSNR at different compression factors for the same fragment and calculated for the same block sizes as in FIG. 16A, but when the zonal compression is used, implementing triangular zone in the frequency domain (that corresponds to discarding the transform coefficients $A_{kj}$ with the sum of indices (k+j) exceeding given value in every block.
Figure 17A:
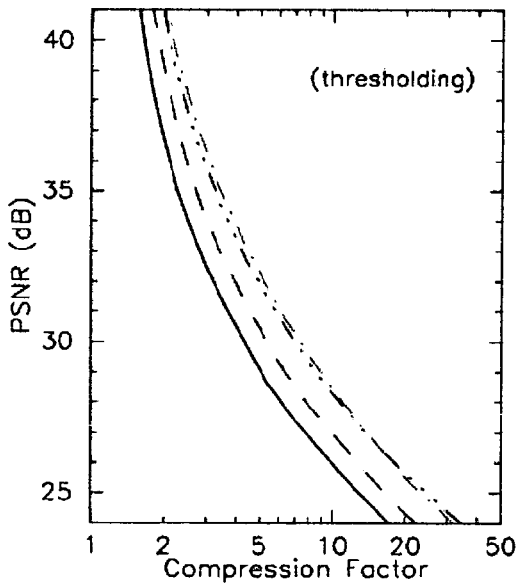
FIG. 17A: PSNR at different compression factors C for the fragment of image "Lena" shown on FIG. 14, when compression is done by the method of thresholding. The curves shown by solid, dashed, dot-dashed, and 3-dot-dashed lines correspond to calculations using block sizes 8×8, 16×16, 32×32, and 64×64 pixels, respectively.
Figure 17B:
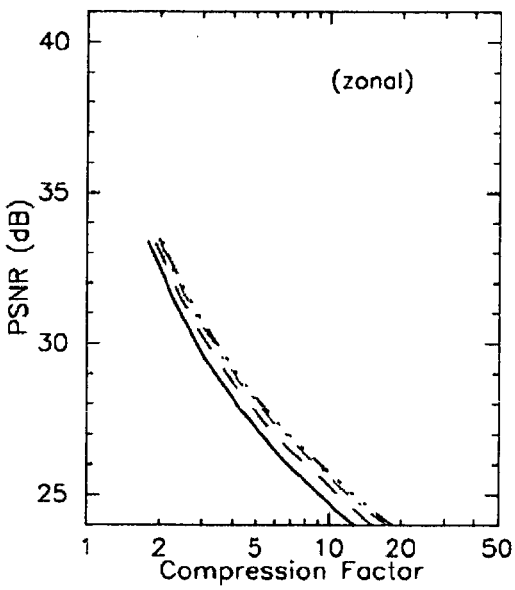
FIG. 17B: same as in FIG. 17A, but when zonal compression is used.
Figures 18A, 18B:
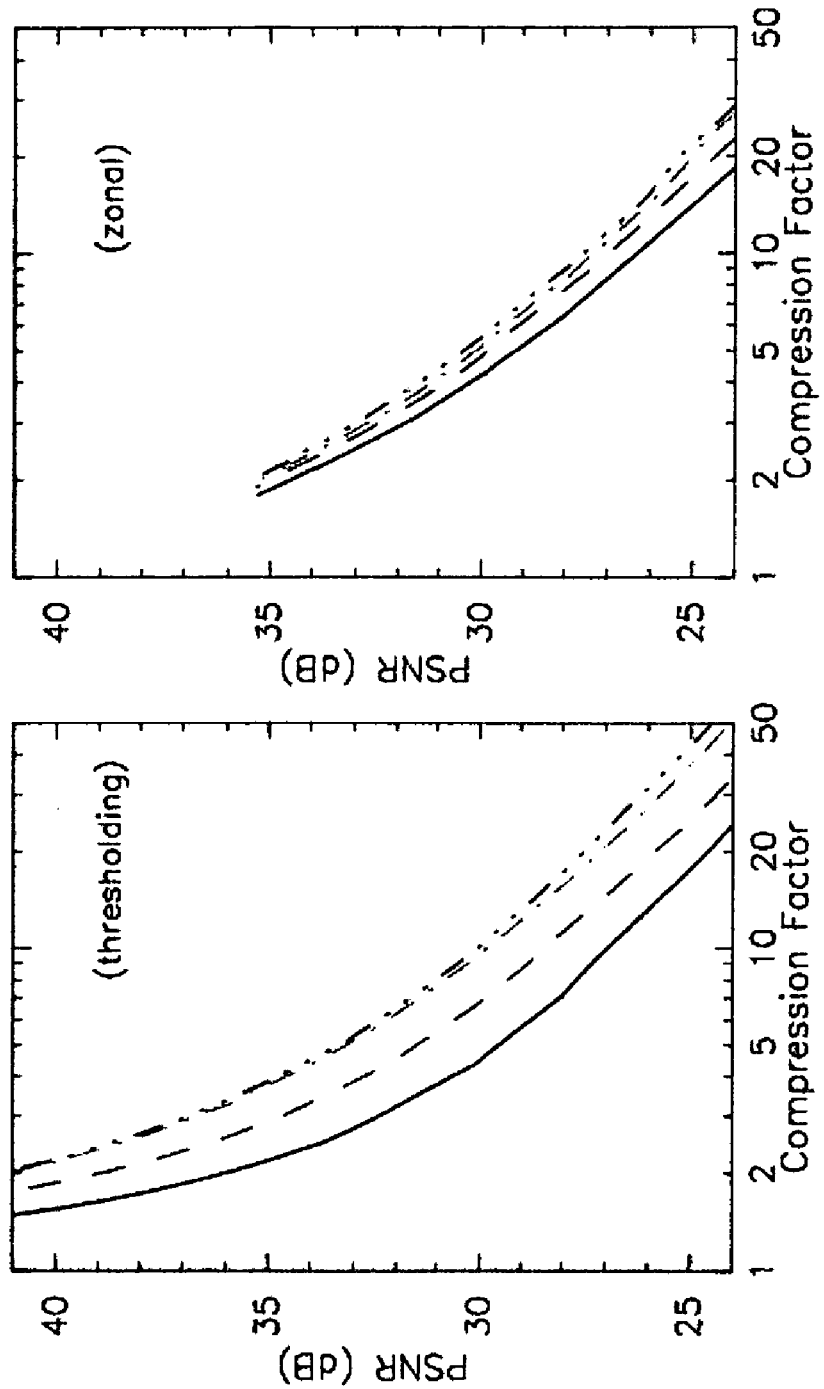
FIG. 18A: PSNR at different compression factors C for the fragment of image "Peppers" shown on FIG. 15, when compression is done by the method of thresholding. The curves shown by solid, dashed, dot-dashed, and 3-dot-dashed lines correspond to calculations using block sizes 8×8, 16×16, 32×32, and 64×64 pixels, respectively.
FIG. 18B: same as in FIG. 17A, but when zonal compression is used.
Figure 19A:
FIG. 19A shows results of interpolation of CEDCT interpolation of a fragment of an original test image "Lena", shown on FIG. 19B, using high-resolution grid with density 3×3 times larger than the original, but in blocks that do not overlap. The block size here is 8×8 pixels, and compression factor is C=1 (i.e. the data set is not compressed).
Figure 19B:
FIG. 19B shows the same as in FIG. 19A for the block size 16×16, and FIG. 19C corresponds to interpolations to the higher resolution grid in blocks of 32×32 pixels.
Figure 19C:
Figure 19D:

In FIGS. 12A to 12D, a 224×224 pixel-size fragment of the original 512×512 resolution test image "Bridge" (FIG. 12A) is shown that was interpolated by 2-D CEDCT to 448×448 pixel resolution image (FIG. 12B). FIG. 12C shows the image compressed to a compression factor C=35 by the method of thresholding quatization subdividing the original image dataset into blocks of size 33×33, overlapping in 1 pixel at the adjacent boundaries, and then using the truncated CEDCT to represent the compressed image with the same 448×448 resolution as in FIG. 12B. Note that overlapping of the adjacent blocks by at least one pixel is needed in the method of interpolation by CEDOFT generally in order to increase the resolution of the image also between the blocks. Otherwise the block effect would become apparent already in the uncompressed images. FIG. 12D shows the same fragment compressed to the same compression factor C=35, and interpolated by the truncated CEDCT to the very same 448×448 resolution grid as in FIG. 12C, but when the thresholding is done in overlapping blocks of size 9×9. This size corresponds to 8×8 interval blocks, for which efficient FFT-type algorithms in case of DCT-1 are available.

The reason that larger block sizes allow better quality of images at the same high compression factors is connected qualitatively with much larger number of transform coefficients that could be available for image manipulation in the transform domain. Thus, in case of 8×8 block there are only 64 coefficients, therefore compression by a factor of 30 leaves, on average, only about 2 terms per block in the CEDCT function. For blocks of size 32×32 the number of transform coefficients and of trigonometric terms left in compressed CEDCT (or CEDOFT generally) is by a factor of 16 larger, providing much wider selectivity for image compression.

This trend of increasing quality of compressed images with just simply increasing the block sizes is demonstrated in FIGS. 13a to 13d, 14a to 14d and 15a to 15d using the examples of 3 known test images, "Bird", "Lena" and "Peppers", respectively. These images are compressed to modest compression factors by using "thresholding compression" in the transform domain (i.e. discarding the transform coefficients smaller than some value determined individually for each block), but without implementing any quantization and coding compression. There is no interpolation of the images as well, so only the discrete inverse DCT is used for image reconstruction. For the assumed compression factors in each of these examples, the increase of the block size results in practical disappearance of visible block artifacts when the block size is increased to 32×32 and 64×64. See Ref. [7] for more discussions of this feature.

The better quality of image reconstruction with increasing block size N×N is demonstrated in FIGS. 16a to 16b, 17a to 17b, and 18a to 18b, where the quantitative measures of image compression quality is plotted for those 3 images, when compression is done without overlapping blocks, as in the JPEG, standard, but for different block sizes. The quality of images at different compression factors is measured by Peak Signal-to-Noise Ratio, abbreviated PSNR. For b-bit data set it is defined as $$PSNR = 10\log_{10}\frac{(2^b-1)^2}{MSE}, \tag{18}$$

where MSE is the mean square error deviation of the compressed image pixel values from the original values (e.g. see Ref. [14]). For all images discussed here b=8. Note that in this case the image reconstruction quality is generally considered as good if PSNR is 30 or higher.

Figure 22A:
FIGS. 22A, 22B, 22C show the results of interpolation of the same fragment to the same 3×3 times higher resolution grid, when compression to a similar factor, C=3.3, is done with blocks of various sizes, but which now overlap by (only) 1 pixel on the adjacent blocks. The reduction of the block artifacts is apparent for all block sizes.
Figure 22B:
Figure 22C:
Figure 22D:
Figure 23A:
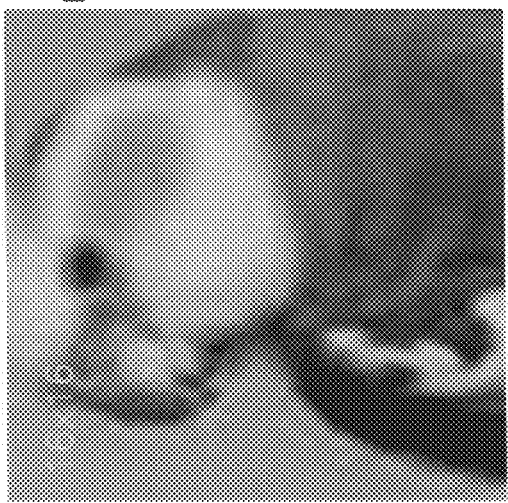
FIGS. 23A, 23B, 23C, and 23D show the results of interpolation of the image bird to the 3×3 times higher resolution grid using compression (by thresholding) to the factor C=9, and overlapping the adjacent block by S=3 pixels.
Figure 23B:
Figure 23C:
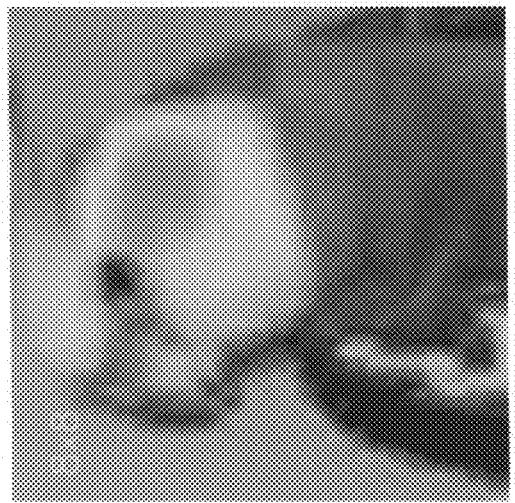
Figure 23D:
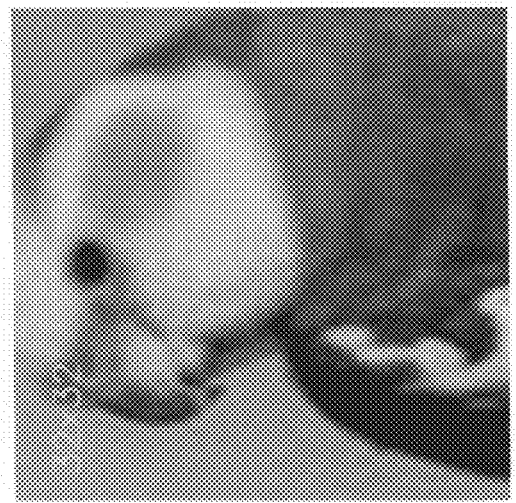
Figures 24A, 24B:
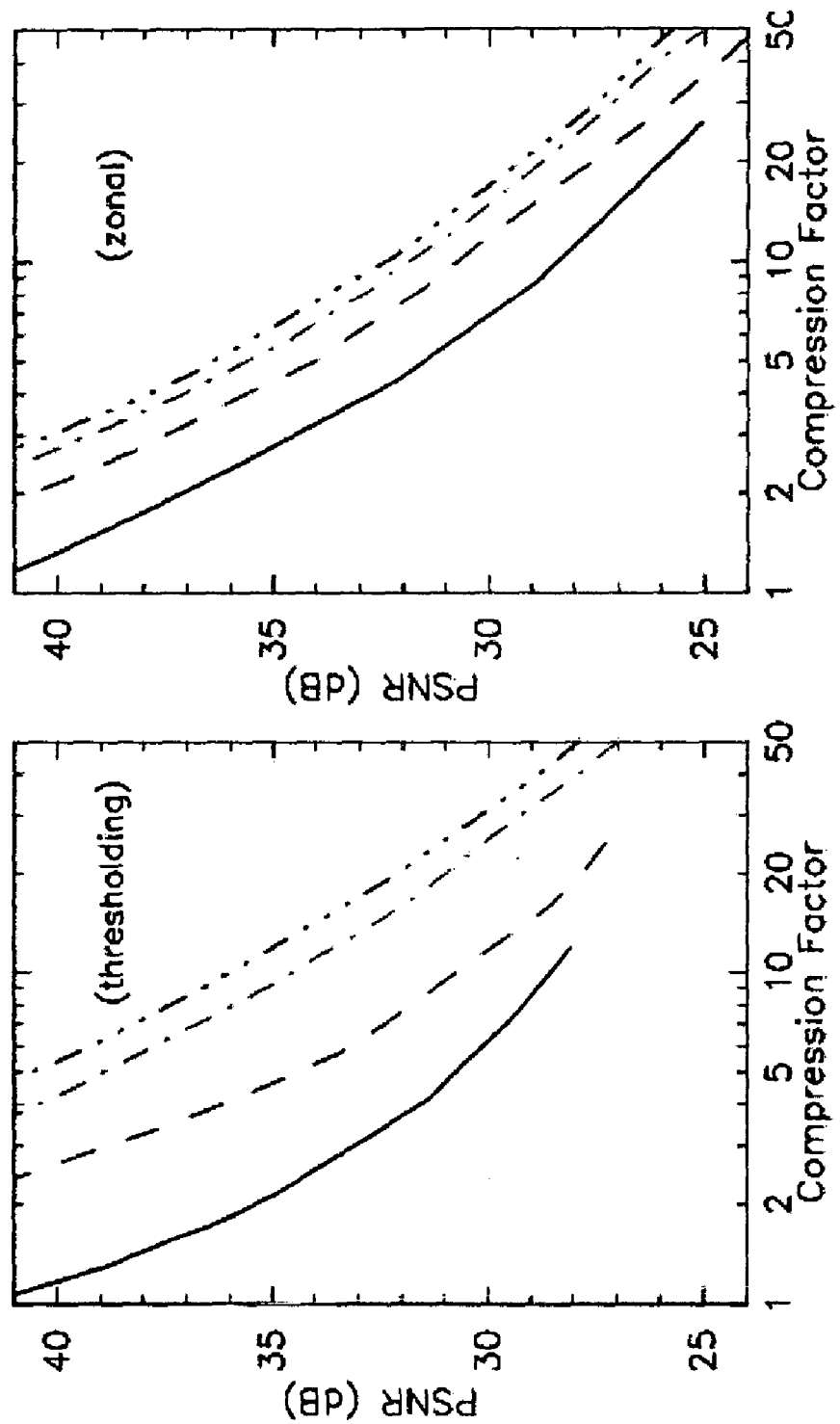
FIGS. 24A and 24B show the PSNR at different compression factors using thresholding and zonal compression techniques, respectively, when calculations are done in blocks of different sizes, using overlapping between the blocks by S=3 pixels (as used in FIGS. 22A, 22B, and 22C).

FIGS. 24A and 24B show the PSNR at different compression factors using thresholding and zonal compression techniques, respectively, when calculations are done in blocks of different sizes, using overlapping between the blocks by S=3 pixels (as used in FIGS. 22A, 22B, and 22C). It can be seen that with increasing the block size the quality/PSNR of the images at the same compression ratio becomes significantly better also in the case when there is a substantial overlap between the blocks.

FIGS. 19a to 19d and 20a to 20d represent examples of CEDCT interpolation when blocks are not overlapping, and compression factor is 1 (i.e. no compression). Although the interpolation apparently improves the quality of the image, the block artifacts are visible in that case even for large block sizes. Without overlapping, the blocks artifacts quickly become very profound even in case of moderate compression factors. This is demonstrated on FIGS. 21A, 21B and 21C, where the same fragment as in FIG. 19 is interpolated without block overlapping, but compressed to the factor C=3.1.

An overlap of adjacent blocks even by q=1 pixel dramatically improves the quality of the image at the same compression factor, as evidenced by FIGS. 22a to 22c for all sizes of the blocks shown: 8×8, 16×16, and 32×32 (in the latter case the block edges cannot be distinguished). The reason for this effect is not only that overlapping of adjacent blocks allows averaging of image intensities on the overlapping pixels, but because overlapping effectively makes the passage of frequency content more continuous between the adjacent blocks.

FIGS. 23a to 23d demonstrate that in case of significant block overlapping, by q=2-4 blocks, it is possible to make the block artifacts disappear for large block sizes even implementing large compression factors. In FIG. 23, the compression factor is C=9 for all block sizes. Note that larger block sizes not only provide better quality of compressed images, but are less sensitive to the effective increase of the volume of computation need in case of overlapping blocks. Indeed, the latter is increased by a factor $(1-q/N)^{-2}$, therefore it is preferable that N be large for any given value q for the overlap size.

When performing image editing or examination, it is advantageous to repeatedly select a different spatial resolution for the compressed image data and view the resulting image. In this case, the compressed image data may remain in a first location for further use as a source image, while the processed image at the different spatial resolution is stored in a second location.

Example

Video Compression

Standard MPEG video compression algorithms combine 2D image compression, namely JPEG, with temporal interpolation techniques that are based on the assumption that a video sequence may contain images having portions that undergo no change at all, such as is the case with a fixed video camera and those portions relating to a fixed background, or portions that move within the 2D frame but otherwise are unchanged, such as is the case with a moving or panning video camera and those portions relating to distant fixed background. The video compression encoding provides for the portions of the image that does change frame by frame, such as a person talking or moving in the foreground. Essentially, a transform compression technique is used only within the 2D image, while coding and interpolation techniques are used to compress and reproduce the temporally unchanging portions, and this is combined with new data, typically compressed using a transform compression technique, for the changing portions to reproduce the whole video sequence.

Transform compression techniques such as JPEG do provide for more efficient 2D image compression than techniques that rely on encoding alone due to the nature of most 2D images and the way in which the human eye perceives any errors introduced during a lossy compression-decompression cycle. However, it is not apparent that a 3D transform, namely a transform of the video stream as a two dimensions of spatial data and one time dimension, can be efficient due to the eye's increased sensitivity to temporal distortions in a video sequence than to spatial distortions. For example, an abrupt change between two scenes from one frame to the next that would be in any way smoothed or temporally distorted would be adversely perceived by a human viewer as blurring. Likewise, a panning action represents for those pixels within the frame that undergo a change from one frame to the next an abrupt change in time. The ability to represent a sharp transition or "edge" in time, in order to satisfy the human eye's sensitive perception of temporal changes, requires maintaining an accurate representation of temporal changes.

Video is essentially a 3D image having pixels in the X, Y and t dimensions. Video is essentially a 3D image having pixels in the X, Y and T dimensions. The grid may be formally considered as rectangular 3D grid also including the T dimension, despite the fact that the time instances $\{t'_s\}$ of taking the image values at the set of spatial grid points $\{(x_i,y_j)|I=0\ldots N, j=0\ldots M\}$ (of the video camera) could be actually different at different points (xi,yj) because of non-zero line-scanning time τ. Although there is a difference between the instances of image intensity measurements at the positions (xi,yj) and (0,0) in the same image frame equal to $$t'_s - t_s \equiv \Delta_{ij} = \left(j + \frac{i}{N}\right)\tau$$

which depends on the position (i,j) in the image frame, the 3D set {xi,yj,t's} as such would make a perfectly equilateral 3D grid of block size [(N+1),(M+1),(L+1)]. This immediately allows application of 3D DCT for these blocks of recorded image values Vijs, resulting in the DCT coefficients:

$$A_{nml} = \sum_{i=0}^{N}\sum_{j=0}^{M}\sum_{s=0}^{L} \frac{C_{N,k}C_{N,n}C_{M,j}C_{M,m}C_{L,s}C_{L,l}}{8NML} \times \cos\frac{\pi nk}{N}\cos\frac{\pi mj}{M}\cos\frac{\pi ls}{L}V_{ijs}$$

The use of these coefficients, either exact or compressed (after quantization), in the inverse DCT of Equation (12) at the receiver/decoder site will result in the recovery of either exact or approximate, respectively, values of {Vijs} at the same positions {xi,yj,t's} as recorded. It will be appreciated, however, that application of the CEDCT at the appropriately corrected grid points $\{x_i,y_j,t'_s\}$, instead of $\{x_i,y_j,t'_s\}$, will result in the image where distortions due to finite line scanning time τ>0 of the recorder will be effectively corrected without any additional efforts at the single step of image decoding.

$$V(i,j,t_s) = \sum_{n=0}^{N}\sum_{m=0}^{M}\sum_{l=0}^{L} A_{nml}\cos\frac{\pi n x_i}{X}\cos\frac{\pi m y_j}{Y}\cos\frac{\pi l t_s}{T}$$

$$= \sum_{n=0}^{N}\sum_{m=0}^{M}\sum_{l=0}^{L} A_{nml}\cos(\pi ni)\cos(\pi mj)\cos\left[\pi l\left(s - \frac{\Delta_{ij}}{T}\right)\right]$$

It has been discovered that the technique of using continuous extensions in accordance with the present invention makes the generation of interpolated images from a transformed source efficient to be successfully applied to the temporal dimension of video storage.

Two fundamental advantages or applications are possible using continuous extensions for video storage and playback. Firstly, the ability to interpolate accurately from the source compressed video data to generate a playback image stream having a different frame rate is advantageous for applications in which the source and the playback display operate a different frame or field rates. This is the case for film that is originally captured at 24 images per second, while playback on a television display is typically at 30 frames per second (more precisely at 60 fields per second for an interlaced television), and while playback on a computer monitor or HDTV is at a higher rate. The present invention thus allows for a video sequence to be stored in the original source video stream acquisition temporal frame rate, and then allow for temporal conversion to take place only at a time of playback and at any rate that can be defined by to the device, and thus can easily allow for accommodation of variety of rates for future play-back devices from the same original image source.

Secondly, spatial interpolation can be performed at the time of playback thus allowing for the video to be recorded in the original source video format and converted to the playback display resolution as required. When only one of the source and playback display device is interlaced, there is need for both temporal and spatial interpolation. An interlaced video stream can be properly spatially and temporally separated at the time of computing transform coefficients and/or at the time of calculating pixels values using the continuous extension functions. Thus it is possible to calculate coefficients using only source pixels, and never interpolated pixels. Likewise, computation of pixels values from the continuous extension functions is only performed for the exact temporal and spatial coordinates needed for the playback display. It is even possible to calculate output pixel values to be sent to a CRT with the temporal delay associated with the CRT's scan delay within a field.

It will be appreciated that in convention video storage, such as DVD, the decompressed video has a predetermined resolution and frame rate. If the source did not have the desired resolution and frame rate for DVD storage, then conversion is performed prior to compression and storage. After decompression at the time of playback, the video codec must perform any desired resolution changes, either spatially or temporally, in pixel space.

In this specification, "original source video stream" means an image stream in the spatial and temporal resolution of the image acquisition equipment used to originally generate the stream. In the case of film, the original source video stream will have 24 frames per second of the studio film camera and the output resolution of the electronic film scanner. In the case of a video camera, the original source video stream will have the pixel layout and resolution of the CCD (or camera output) and the camera output frame rate.

As with 2D images, the blocks have an overlap of at least one pixel. In the time dimension, it is best to have only a single pixel overlap, as an accurate temporal representation is important.

REFERENCES

1. R. V. Moody, J. Patera. Computation of character decompositions of class functions on compact semisimple Lie groups, *Mathematics of Computation*, vol. 48 (1987), pp. 799-827.
2. A. L. Onishchik, E. B. Vinberg (eds.). Lie groups and Lie algebras III: structure of Lie groups and Lie algebras, Berlin, New-York, Springer-Verlag, 1994.
3. M. Bremner, R. V. Moody, J. Patera. Tables of dominant weight multiplicities for representations of simple Lie group algebras, Marcel Dekker, New York, 1985.
4. W. McKay, J. Patera. Tables of dimensions, indices, and branching rules for representations of simple Lie algebras, Marcel Dekker, New York, 1981.
5. W. McKay, J. Patera, D. Rand, Tables of representations of simple Lie algebras, Exceptional simple Lie algebras, Les Publications CRM, Montreal 1990
6. A. Atoyan, J. Patera, Properties of continuous Fourier extension of the discrete cosine transform and its multidimensional generalization, *J. Math. Phys.* Vol. 45 (2004), pp. 2468-2491
7. A. Atoyan, J. Patera, 2005, Continuous extension of the discrete cosine transform, and its applications to data processing", CRM Proceedings and Lecture Notes, vol. 39, 2005, in press; (Proc. "Workshop on group theory and numerical methods", Montreal, 26-31 May 2003),
8. A. Atoyan, J. Patera. 2005, Application of continuous extension of DCT to FLIR images, in E. Shahbazian, G. Rogova, P. Valin (eds.) "Data Fusion for Situation Monitoring, Incident Detection, Alert and Response Management", ISO Press, Amsterdam, 2005 in press; (Proc. NATO ASI-03, Tsakhkadzor, Armenia, Aug. 18-29, 2003)
9. A. Atoyan, J. Patera, V. Sahakian, A. Akhperjanian, Fourier transform method for imaging atmospheric Cherenkov telescopes, *Astroparticle Physics*, vol. 23 (2005), pp. 79-95.
10. A. Akhperjanian, A. Atoyan, J. Patera, V. Sahakian. 2005, Application of multi-dimensional discrete transforms on Lie groups for image processing, in E. Shahbazian, G. Rogova, P. Valin (eds.) "Data Fusion for Situation Monitoring, Incident Detection, Alert and Response Management", ISO Press, Amsterdam, 2005 in press; (Proc. NATO ASI-03, Tsakhkadzor, Armenia, Aug. 18-29, 2003)
11. J. Patera, A. Zaratsyan, Discrete and continuous cosine transform generalized to the Lie groups $SU(2) \times SU(2)$ and $O(5)$, to appear in *J. Math. Phys.*, May 2005.
12. J. Patera, A. Zaratsyan, Discrete and continuous cosine transform generalized to the Lie groups $SU(3)$ and $G(2)$, submitted to *J. Math. Phys.*, 2005
13. K. R. Rao, P. Yip, "Discrete cosine transform—Algorithms, Advantages, Applications", Academic Press (1990)
14. H. J. Nussbaumer, Fast Fourier transform and convolution algorithms, Springer-Verlag, Berlin Heidelberg N-Y (1982)

The invention claimed is:

1. An apparatus for generating and playing back video, the apparatus comprising:
   a processor configured to:
   provide an image dataset having a temporal dimension and at least two spatial dimensions;
   define at least two blocks of said image dataset with an overlap of at least one grid point in the temporal dimension;
   calculate forward discrete orbit function transform (DOFT) coefficients representing said blocks;
   generate video data using said DOFT coefficients;
   define a different spatial resolution for video playback having a different temporal frame rate;
   determine a continuous extension of discrete orbit function transform (CEDOFT) representing each of said blocks using said DOFT coefficients in said video data; and
   generate a playback video image stream using said at least one CEDOFT and said different spatial resolution.

2. The apparatus as claimed in claim 1, wherein said image dataset is an original source video stream, said video data is compressed and recorded, and said processor is configured to determine said CEDOFT is performed when reading said recorded video data.

3. The apparatus as claimed in claim 2, wherein said different spatial resolution is different for both temporal and spatial dimensions.

4. The apparatus as claimed in claim 3, wherein interlace conversion is performed by the processor.

* * * * *